US010264068B2

United States Patent
Sato

(10) Patent No.: US 10,264,068 B2
(45) Date of Patent: Apr. 16, 2019

(54) INFORMATION PROCESSING APPARATUS THAT SETS SYNCHRONIZATION DESTINATION OF SETTING INFORMATION, IMAGE PROCESSING APPARATUS, COMMUNICATION SYSTEM, SYNCHRONIZATION METHOD, AND STORAGE MEDIUM

(71) Applicant: CANON KABUSHIKI KAISHA, Tokyo (JP)

(72) Inventor: Shogo Sato, Toride (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/248,451

(22) Filed: Aug. 26, 2016

(65) Prior Publication Data

US 2017/0060501 A1 Mar. 2, 2017

(30) Foreign Application Priority Data

Aug. 31, 2015 (JP) ................................. 2015-170519
Mar. 31, 2016 (JP) ................................. 2016-071547

(51) Int. Cl.
*G06F 3/12* (2006.01)
*H04N 1/00* (2006.01)
*H04L 29/08* (2006.01)

(52) U.S. Cl.
CPC ........ *H04L 67/1095* (2013.01); *G06F 3/1204* (2013.01); *G06F 3/1229* (2013.01);
(Continued)

(58) Field of Classification Search
CPC .......... H04N 1/00344; H04N 1/00204; H04N 1/00928; H04N 1/00973; H04N 1/32496;
(Continued)

(56) References Cited

U.S. PATENT DOCUMENTS 8,243,312 B2 * 8/2012 Kasatani ............. H04L 63/0815
358/1.15
8,248,630 B2 8/2012 Fukuda
(Continued)

FOREIGN PATENT DOCUMENTS

CN 101483707 A 7/2009
CN 102123220 A 7/2011
(Continued)

OTHER PUBLICATIONS

Office Action issued in Chinese Appln. No. 201610792302.6 dated Sep. 20, 2018. English translation provided.

*Primary Examiner* — Gabriel I Garcia
(74) *Attorney, Agent, or Firm* — Rossi, Kimms & McDowell LLP

(57) ABSTRACT

An information processing apparatus capable of flexibly making a setting of a synchronization destination of setting information according to user's intention. In a communication system, a server performs data communication with each of MFPs, and the communication system stores a plurality of types of setting information to be synchronized with each MFP. A synchronization destination of the plurality of types of setting information is set. The setting information is synchronized with the set synchronization destination. The synchronization destination of the setting information is changed, on a setting information type by setting information type basis.

6 Claims, 27 Drawing Sheets

(52) U.S. Cl.
CPC .......... *G06F 3/1286* (2013.01); *G06F 3/1291* (2013.01); *H04N 1/00127* (2013.01)

(58) Field of Classification Search
CPC ............ H04N 1/32523; H04N 1/00127; H04L 67/1095
USPC .................................................. 358/11–1.18
See application file for complete search history.

(56) References Cited

U.S. PATENT DOCUMENTS

| | | | |
|---|---|---|---|
| 8,823,966 B2 | 9/2014 | Lee et al. | |
| 8,953,202 B2 | 2/2015 | Ishigure | |
| 2009/0238213 A1* | 9/2009 | Kasatani | H04N 1/00344 370/503 |
| 2010/0228836 A1* | 9/2010 | Lehtovirta | H04L 12/00 709/220 |
| 2011/0320952 A1* | 12/2011 | Kataoka | H04L 41/0253 715/735 |
| 2014/0139871 A1* | 5/2014 | Igarashi | H04N 1/00344 358/1.15 |
| 2015/0178030 A1* | 6/2015 | Kasahara | G06F 3/1205 358/1.15 |
| 2015/0189116 A1* | 7/2015 | Ito | H04N 1/00973 358/1.13 |
| 2017/0041488 A1* | 2/2017 | Shibata | H04N 1/00344 |

FOREIGN PATENT DOCUMENTS

| | | |
|---|---|---|
| CN | 103034462 A | 4/2013 |
| JP | 2002135250 A | 5/2002 |
| JP | 2011066660 A | 3/2011 |

* cited by examiner

FIG. 9

| SETTING INFORMATION IDENTIFIER | DATA |
|---|---|
| group_0.settings.copy.default_job.copy.dual-side | SINGLE-SIDE |
| group_0.settings.copy.default_job.copy.staple | OFF |
| group_1.settings.copy.default_job.copy.dual-side | DUAL-SIDE |
| group_1.settings.copy.default_job.copy.staple | ON |
| device_10001.settings.common.sleep_time | 10 MIN |
| device_10002.settings.common.sleep_time | 30 MIN |
| device_10003.settings.common.sleep_time | 10 MIN |
| device_10004.settings.common.sleep_time | 1 MIN |
| device_10005.settings.common.sleep_time | 1 MIN |
| group_0.addressbook.fax_addressbook.1 | XXX-000-1111 |
| group_0.addressbook.fax_addressbook.2 | XXX-000-2222 |
| group_1.addressbook.fax_addressbook.1 | YYY-000-1111 |
| group_1.addressbook.fax_addressbook.2 | YYY-000-2222 |
| user.custom_menu.type | COPY |
| user.custom_menu.settingvalue | 1A2B3C4D5E6F |

| SHARED RANGE ID | GROUP IDENTIFIER | GROUP NAME | DEVICE ID | TYPE | SHARED RANGE |
|---|---|---|---|---|---|
| 1 | 0 | SALES | 100001 | settings.copy.default_job | GROUP |
| 2 | 0 | SALES | 100001 | settings.common.sleep_time | SPECIFIC |
| 3 | 0 | SALES | 100001 | addressbook.fax_addressbook | GROUP |
| 4 | 0 | SALES | 100001 | user.custom_menu | ALL |
| 5 | 0 | SALES | 100002 | settings.copy.default_job | GROUP |
| 6 | 0 | SALES | 100002 | settings.common.sleep_time | SPECIFIC |
| 7 | 0 | SALES | 100002 | addressbook.fax_addressbook | GROUP |
| 8 | 0 | SALES | 100002 | user.custom_menu | ALL |
| 9 | 0 | SALES | 100003 | settings.copy.default_job | GROUP |
| 10 | 0 | SALES | 100003 | settings.common.sleep_time | SPECIFIC |
| 11 | 0 | SALES | 100003 | addressbook.fax_addressbook | GROUP |
| 12 | 0 | SALES | 100003 | user.custom_menu | ALL |
| 13 | 1 | PERSONNEL | 100004 | settings.copy.default_job | GROUP |
| 14 | 1 | PERSONNEL | 100004 | settings.common.sleep_time | SPECIFIC |
| 15 | 1 | PERSONNEL | 100004 | addressbook.fax_addressbook | GROUP |
| 16 | 1 | PERSONNEL | 100004 | user.custom_menu | ALL |
| 17 | 1 | PERSONNEL | 100005 | settings.copy.default_job | GROUP |
| 18 | 1 | PERSONNEL | 100005 | settings.common.sleep_time | SPECIFIC |
| 19 | 1 | PERSONNEL | 100005 | addressbook.fax_addressbook | GROUP |
| 20 | 1 | PERSONNEL | 100005 | user.custom_menu | ALL |

FIG. 16

| SETTING INFORMATION ID | SETTING INFORMATION IDENTIFIER | DATA |
|---|---|---|
| 1 | settings.copy.default_job.copy.dual-side | SINGLE-SIDE |
| 2 | settings.copy.default_job.copy.staple | OFF |
| 3 | settings.copy.default_job.copy.dual-side | DUAL-SIDE |
| 4 | settings.copy.default_job.copy.staple | ON |
| 5 | settings.common.sleep_time | 10 MIN |
| 6 | settings.common.sleep_time | 30 MIN |
| 7 | settings.common.sleep_time | 10 MIN |
| 8 | settings.common.sleep_time | 1 MIN |
| 9 | settings.common.sleep_time | 1 MIN |
| 10 | addressbook.fax_addressbook.1 | XXX-000-1111 |
| 11 | addressbook.fax_addressbook.2 | XXX-000-2222 |
| 12 | addressbook.fax_addressbook.1 | YYY-000-1111 |
| 13 | addressbook.fax_addressbook.2 | YYY-000-2222 |
| 14 | custom_menu.type | COPY |
| 15 | custom_menu.settingvalue | 1A2B3C4D5E6F |

| SETTING INFORMATION ID | SETTING INFORMATION IDENTIFIER | DATA |
|---|---|---|
| 1 | settings.copy.default_job.copy.dual-side | SINGLE-SIDE |
| 2 | settings.copy.default_job.copy.staple | OFF |
| 4 | settings.copy.default_job.copy.staple | ON |
| 5 | settings.common.sleep_time | 10 MIN |
| 6 | settings.common.sleep_time | 30 MIN |
| 7 | settings.common.sleep_time | 10 MIN |
| 8 | settings.common.sleep_time | 1 MIN |
| 9 | settings.common.sleep_time | 1 MIN |
| 10 | addressbook.fax_addressbook.1 | XXX-000-1111 |
| 11 | addressbook.fax_addressbook.2 | XXX-000-2222 |
| 12 | addressbook.fax_addressbook.1 | YYY-000-1111 |
| 13 | addressbook.fax_addressbook.2 | YYY-000-2222 |
| 14 | custom_menu.type | COPY |
| 15 | custom_menu.settingvalue | 1A2B3C4D5E6F |

| SETTING INFORMATION ID | SETTING INFORMATION IDENTIFIER | DATA |
|---|---|---|
| 1 | settings.copy.default_job.copy.dual-side | SINGLE-SIDE |
| 2 | settings.copy.default_job.copy.staple | OFF |
| 3 | settings.copy.default_job.copy.dual-side | DUAL-SIDE |
| 4 | settings.copy.default_job.copy.staple | ON |
| 5 | settings.common.sleep_time | 10 MIN |
| 6 | settings.common.sleep_time | 30 MIN |
| 7 | settings.common.sleep_time | 10 MIN |
| 8 | settings.common.sleep_time | 1 MIN |
| 9 | settings.common.sleep_time | 1 MIN |
| 10 | addressbook.fax_addressbook.1 | XXX-000-1111 |
| 11 | addressbook.fax_addressbook.2 | XXX-000-2222 |
| 12 | addressbook.fax_addressbook.1 | YYY-000-1111 |
| 13 | addressbook.fax_addressbook.2 | YYY-000-2222 |
| 14 | custom_menu.type | COPY |
| 15 | custom_menu.settingvalue | 1A2B3C4D5E6F |
| 16 | settings.copy.default_job.copy.dual-side | SINGLE-SIDE |
| 17 | settings.copy.default_job.copy.staple | OFF |
| 18 | settings.copy.default_job.copy.dual-side | SINGLE-SIDE |
| 19 | settings.copy.default_job.copy.staple | OFF |
| 20 | settings.copy.default_job.copy.dual-side | DUAL-SIDE |
| 21 | settings.copy.default_job.copy.staple | ON |

903

INFORMATION PROCESSING APPARATUS THAT SETS SYNCHRONIZATION DESTINATION OF SETTING INFORMATION, IMAGE PROCESSING APPARATUS, COMMUNICATION SYSTEM, SYNCHRONIZATION METHOD, AND STORAGE MEDIUM

BACKGROUND OF THE INVENTION

Field of the Invention

The present invention relates to an information processing apparatus that sets a synchronization destination of setting information, an image processing apparatus, a communication system, a synchronization method, and a storage medium, and more particularly to an information processing apparatus that synchronizes various types of setting information, an image processing apparatus, a communication system, a synchronization method, and a storage medium.

Description of the Related Art

There has been known a communication system in which a server as an information processing apparatus manages various types of setting information used by each of MFPs as a plurality of image processing apparatuses. In the communication system, the server stores various types of setting information used by the MFPs, such as address information used for FAX communication and the like, and custom setting information used for facilitating execution of an operation desired by a user. The server is capable of synchronizing the various types of setting information with the plurality of MFPs, and for example, the server is capable of sharing (synchronizing) a certain piece of setting information with the plurality of MFPs. For each piece of setting information, the server manages information concerning whether or not to share the piece of setting information, using a sharing enable/disable table, and synchronizes the various types of setting information with each MFP based on the sharing enable/disable table e.g. when the communication system is started (see e.g. Japanese Patent Laid-Open Publication No. 2002-135250).

However, in the technique disclosed in Japanese Patent Laid-Open Publication No. 2002-135250, there is a case where it is impossible to make a setting as to whether or not to share the setting information, as desired by a user. For example, in the technique disclosed in Japanese Patent Laid-Open Publication No. 2002-135250, it is impossible to make settings such that one piece of setting information is shared with all of the MFPs, and another piece of setting information is shared with some of the MFPs. Further, in the technique disclosed in Japanese Patent Laid-Open Publication No. 2002-135250, in a case where another MFP is newly added to the communication system, a user cannot make a setting as to whether or not to share setting information with the newly added MFP. That is, in the conventional technique, it is impossible to flexibly set a sharing destination of setting information according to the intention of a user.

SUMMARY OF THE INVENTION

The present invention provides an information processing apparatus that is capable of flexibly making a setting of a synchronization destination of setting information according to the intention of a user, an image processing apparatus, a communication system, a synchronization method, and a storage medium.

In a first aspect of the invention, there is provided an information processing apparatus that performs data communication with each of a plurality of image processing apparatuses, and stores a plurality of types of setting information to be synchronized with each of the image processing apparatuses, comprising at least one processor and a memory coupled to the at least one processor which act as a setting unit configured to set a synchronization destination of the plurality of types of setting information, and a synchronization unit configured to synchronize the setting information with the set synchronization destination, wherein the setting unit changes the synchronization destination of the setting information, on a setting information type by setting information type basis.

In a second aspect of the invention, there is provided an image processing apparatus that performs data communication with each of a plurality of other image processing apparatuses, and stores a plurality of types of setting information to be synchronized with each of the other image processing apparatus, comprising at least one processor and a memory coupled to the at least one processor which act as a setting unit configured to set a synchronization destination of the plurality of types of setting information, and a synchronization unit configured to synchronize the setting information with the set synchronization destination, wherein the setting unit changes the synchronization destination of the setting information, on a setting information type by setting information type basis.

In a third aspect of the invention, there is provided a communication system in which an information processing apparatus performs data communication with each of a plurality of image processing apparatuses, the communication system storing a plurality of types of setting information to be synchronized with each of the image processing apparatuses, comprising at least one processor and a memory coupled to the at least one processor which act as a setting unit configured to set a synchronization destination of the plurality of types of setting information, and a synchronization unit configured to synchronize the setting information with the set synchronization destination, wherein the setting unit changes the synchronization destination of the setting information, on a setting information type by setting information type basis.

In a fourth aspect of the invention, there is provided a synchronization method for a communication system in which an information processing apparatus performs data communication with each of a plurality of image processing apparatuses, the communication system storing a plurality of types of setting information to be synchronized with each of the image processing apparatuses, comprising setting a synchronization destination of the plurality of types of setting information, synchronizing the setting information with the set synchronization destination, and changing the synchronization destination of the setting information, on a setting information type by setting information type basis.

In a fifth aspect of the invention, there is provided a non-transitory computer-readable storage medium storing a computer-executable program for executing a synchronization method for a communication system in which an information processing apparatus performs data communication with each of a plurality of image processing apparatuses, the communication system storing a plurality of types of setting information to be synchronized with each of the image processing apparatuses, wherein the method comprises setting a synchronization destination of the plurality of types of setting information, synchronizing the setting information with the set synchronization destination, and changing the synchronization destination of the setting information, on a setting information type by setting information type basis.

According to the present invention, it is possible to make a setting of a synchronization destination of setting information according to the intention of a user.

Further features of the present invention will become apparent from the following description of exemplary embodiments (with reference to the attached drawings).

BRIEF DESCRIPTION OF THE DRAWINGS

FIG. 9 is a table showing the contents of a setting information database included in the management data.

FIG. 14 is a table showing the contents of a shared range management database included in the management data.

FIG. 16 is a table showing the contents of a setting information database included in the management data.

FIG. 18 is a table showing the setting information database including updated contents, which is included in the management data.

FIG. 19 is a table showing the setting information database including added contents, which is included in the management data.

DESCRIPTION OF THE EMBODIMENTS

The present invention will now be described in detail below with reference to the accompanying drawings showing embodiments thereof.

Although in the present embodiment, a description will be given of a case where the present invention is applied to a server as an information processing apparatus that is capable of synchronizing various kinds of data with an MFP as an image forming apparatus, the present invention is not limitedly applied to the server. For example, the present invention can be applied to any of another MFP, a client PC, and a smartphone, as an image processing apparatus, which is capable of synchronizing various types of data with the MFP.

Further, a state in which a server and an MFP share common setting information at the same time is referred to as a state in which the server and the MFP synchronize the setting information with each other.

Figure 1:
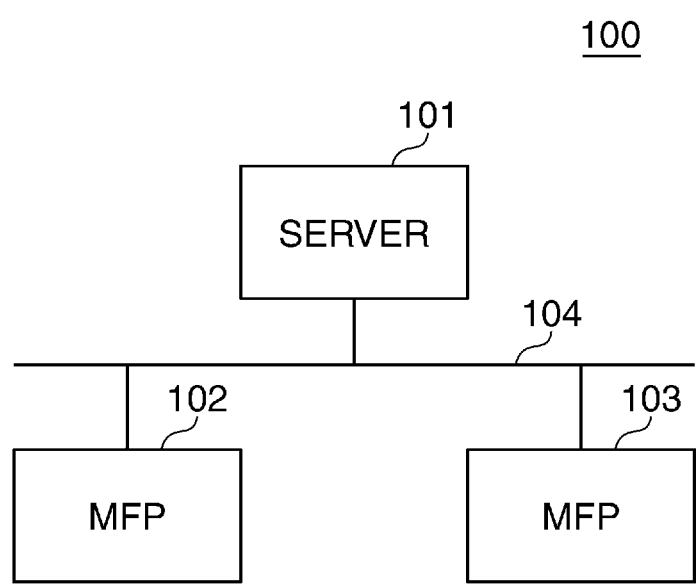
FIG. 1 is a schematic block diagram of a communication system including a server as an information processing apparatus according to an embodiment of the present invention.

FIG. 1 is a schematic block diagram of a communication system 100 including a server 101 as an information processing apparatus according to the embodiment of the present invention.

Referring to FIG. 1, the communication system 100 includes the server 101, and MFPs 102 and 103 as image forming apparatuses, and the server 101 and the MFPs 102 and 103 are connected to each other via a network 104.

In the communication system 100, a plurality of types of setting information, which are information used in various processing performed by each of the MFPs 102 and 103, are managed by the server 101. The setting information includes address information used for FAX communication and the like, custom setting information used for facilitating execution of an operation of a user as desired, and so forth. The server 101 acquires setting information to be managed (hereinafter referred to as the "management target setting information") from the MFPs 102 and 103, and stores the acquired management target setting information therein. Further, the server 101 is capable of synchronizing the stored management target setting information with at least one of the MFPs 102 and 103, and for example, the server 101 is capable of sharing (synchronizing) certain management target setting information with the MFPs 102 and 103. The MFPs 102 and 103 are capable of performing various processing, such as copy processing, scan processing, and FAX communication processing.

Figure 2:
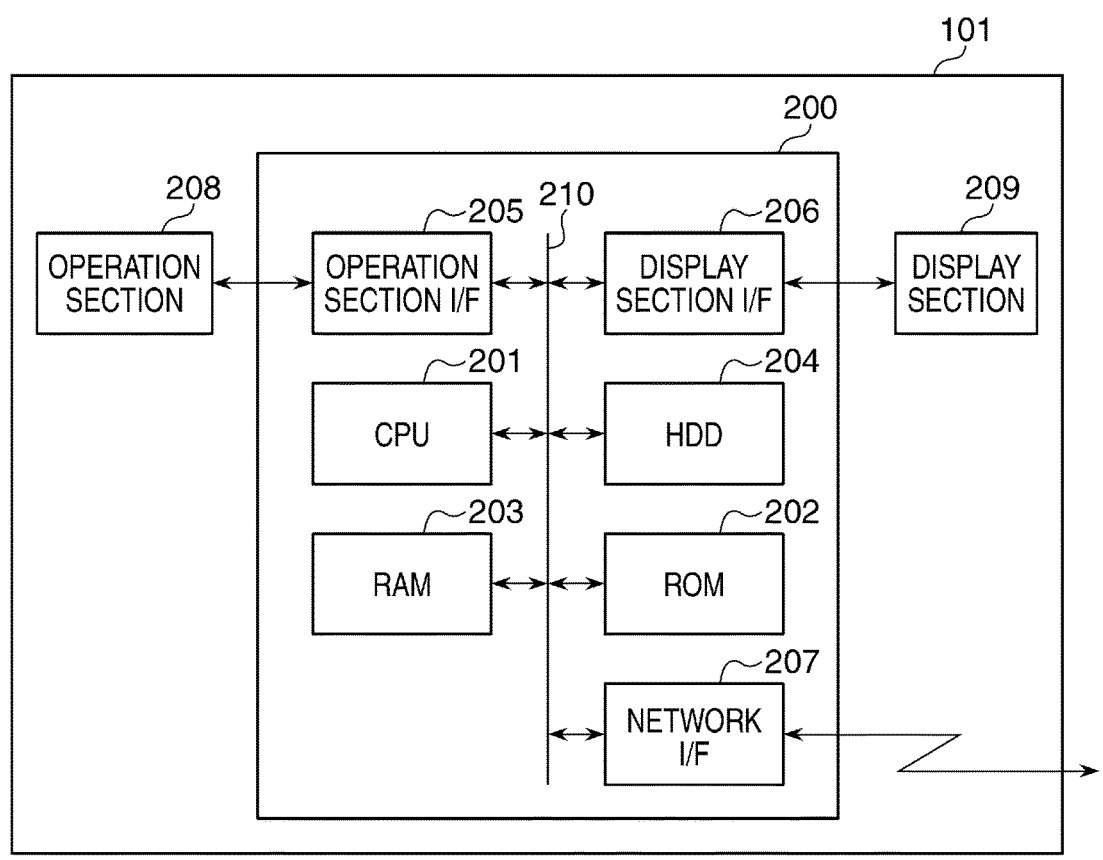
FIG. 2 is a schematic block diagram of the server appearing in FIG. 1.

FIG. 2 is a schematic block diagram of the server 101 appearing in FIG. 1.

Referring to FIG. 2, the server 101 is comprised of a controller 200, an operation section 208, and a display section 209, and the controller 200 is connected to the operation section 208 and the display section 209. The controller 200 includes a CPU 201, a ROM 202, a RAM 203, an HDD 204, an operation section interface 205, a display section interface 206, and a network interface 207, and these components are interconnected to each other via a system bus 210.

The controller 201 controls the overall operation of the server 101. The CPU 201 performs various types of control by executing various programs stored in the ROM 202. The ROM 202 stores various programs and various data used by the CPU 201. The RAM 203 is used as a work area for the CPU 201, and is also used as an area for temporarily storing various data. The HDD 204 stores various programs and various data. In the present embodiment, the HDD 204 stores management data 500, described hereinafter with reference to FIG. 5, for managing the management target setting information acquired from the MFPs 102 and 103. The operation section interface 205 performs data communication with the operation section 208, and the display section interface 206 performs data communication with the display section 209. The network interface 207 performs data communication with the MFPs 102 and 103 and so forth, which are connected to the network 104. The operation section 208 includes various setting keys, not shown, and sends information input by a user's operation on the operation section 208 to the CPU 201 via the operation section interface 205. The display section 209, which includes a display, not shown, acquires image data for displaying various images from the display section interface 206, and displays, for example, a setting menu for configuring various settings, based on the acquired image data. In the present embodiment, the display section 209 displays a setting menu 800 (setting screen), described hereinafter with reference to FIG. 12, for setting a synchronization destination of the management target setting information.

Next, a description will be given of the configuration of the MFPs 102 and 103. In the present embodiment, the MFPs 102 and 103 have the same configuration, and hence the configuration of the MFP will be described using the MFP 102 by way of example.

Figure 3:
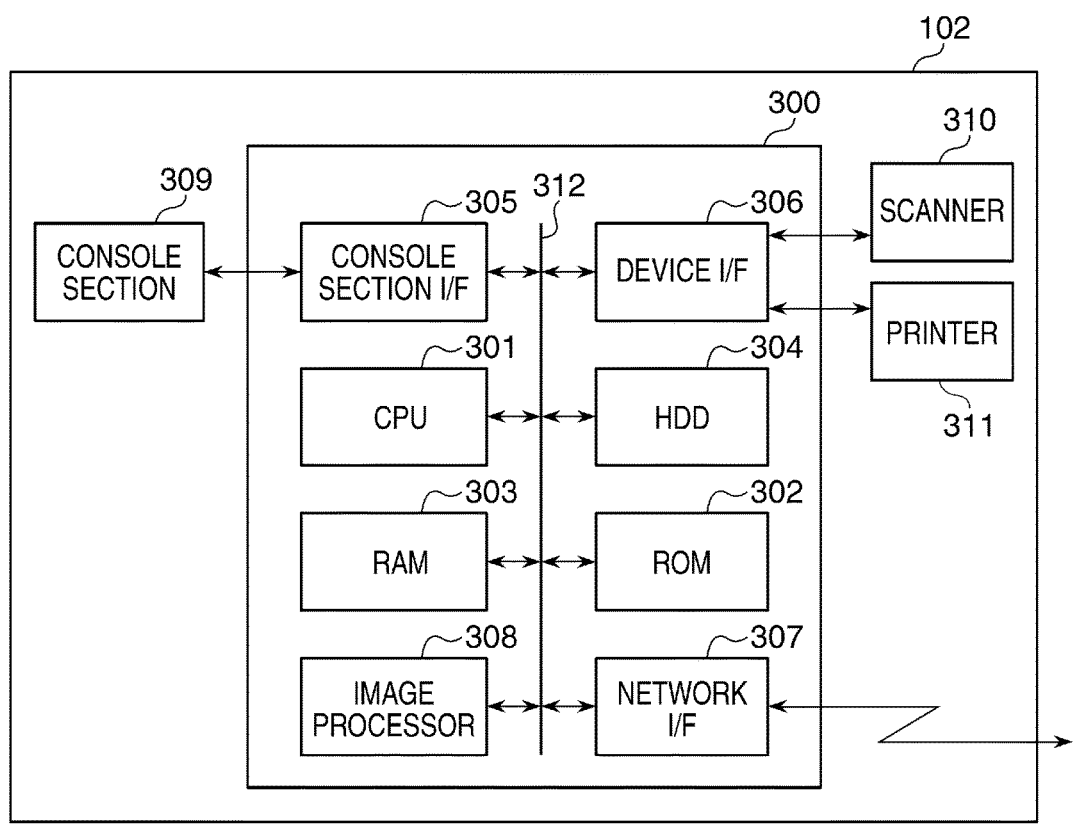
FIG. 3 is a schematic block diagram of an MFP appearing in FIG. 1.

FIG. 3 is a schematic block diagram of the MFP 102 appearing in FIG. 1.

Referring to FIG. 3, the MFP 102 is comprised of a controller 300, a console section 309, a scanner 310, and a printer 311, and the controller 300 is connected to the console section 309, the scanner 310, and the printer 311. The controller 300 includes a CPU 301, a ROM 302, a RAM 303, an HDD 304, a console section interface 305, a device interface 306, a network interface 307, and an image processor 308, and these components are connected to each other via a system bus 312.

The controller 300 controls the overall operation of the MFP 102. The CPU 301 performs various types of control by executing various programs stored in the ROM 302. The ROM 302 stores various programs used by the CPU 301 and various data. The RAM 303 is used as a work area for the CPU 301, and is also used as an area for temporarily storing various data. The HDD 304 stores various programs and various data. The console section interface 305 performs data communication with the console section 309, and the device interface 306 performs data communication with the scanner 310 and the printer 311. The network interface 307 performs data communication with the server 101, the MFP 103, and so forth, which are connected to the network 104. The image processor 308 performs various image processing, such as image rotation, image compression, resolution conversion, color space conversion, and gradation conversion, on image data and the like acquired by the scanner 103. The console section 309 includes a touch-panel type display and various setting keys, none of which are shown. The console section 309 sends information input by a user's operation on the console section 309 to the CPU 301 via the console section interface 305. Further, the console section 309 acquires image data for displaying various images from the console section interface 305, and displays, for example, a setting menu for configuring various settings, based on the acquired image data. The scanner 310 acquires image data by reading an original placed on an original platen glass, not shown, and sends the acquired image data to the image processor 308 via the device interface 306. The printer 311 acquires print data to be printed from the device interface 306, and performs print processing based on the acquired print data.

Figure 4:
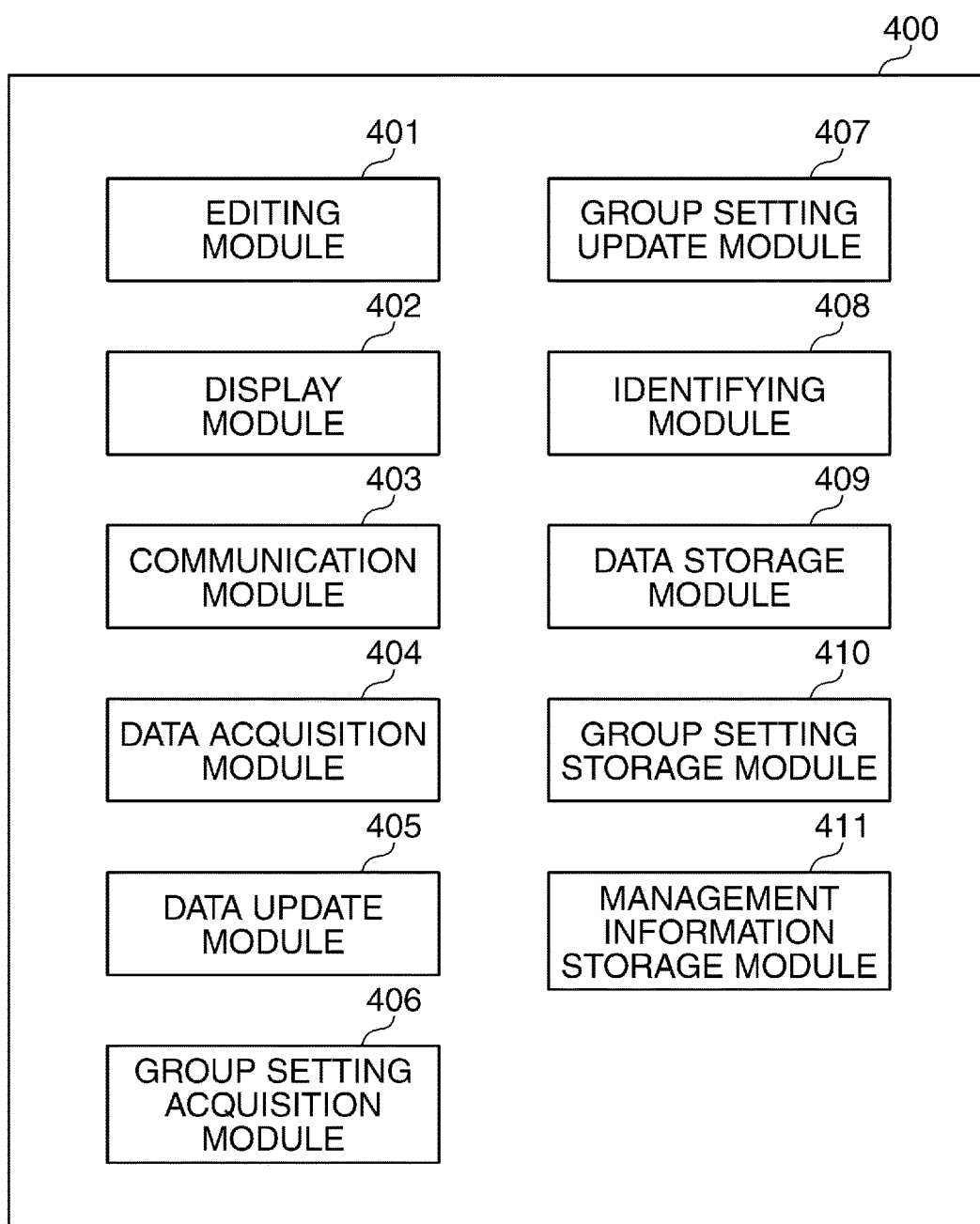
FIG. 4 is a schematic block diagram of a management module of the server appearing in FIG. 1.

FIG. 4 is a schematic block diagram of a management module 400 of the server 101 appearing in FIG. 1.

Referring to FIG. 4, the management module 400 includes an editing module 401, a display module 402, a communication module 403, a data acquisition module 404, and a data update module 405. Further, the management module 400 includes a group setting acquisition module 406, a group setting update module 407, an identifying module 408, a data storage module 409, a group setting storage module 410, and a management information storage module 411. Various processes of the management module 400 are performed by the CPU 201 that executes various programs stored in the ROM 202.

Figure 5:
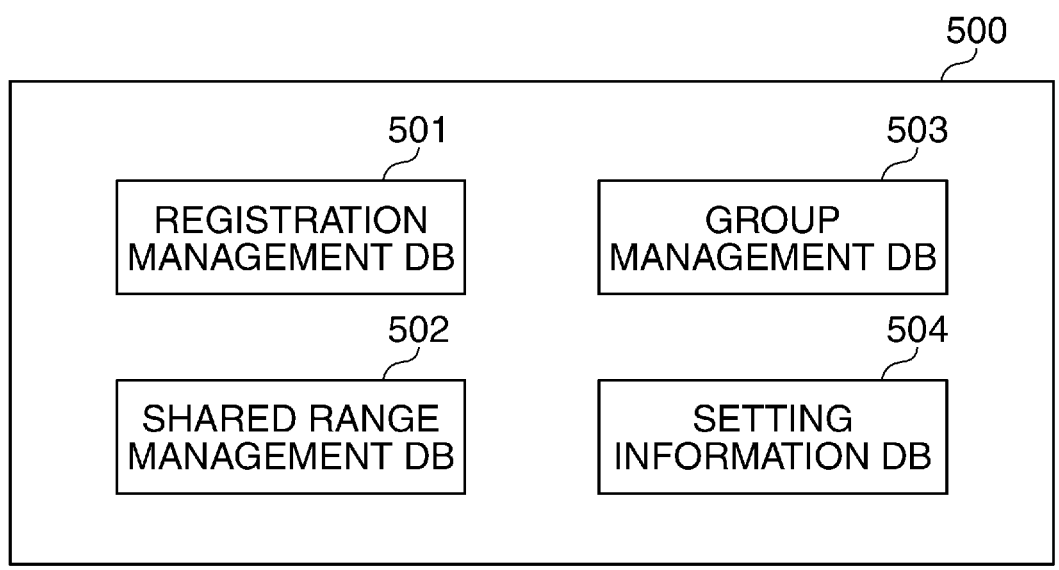
FIG. 5 is a schematic block diagram of management data used by the server appearing in FIG. 1.

Referring to FIG. 5, the management module 400 manages the management data 500. The management data 500 is data for managing the management target setting information acquired e.g. from the MFPs 102 and 103, and includes a registration management database 501, a shared range management database 502, a group management database 503, and a setting information database 504.

Figure 6:
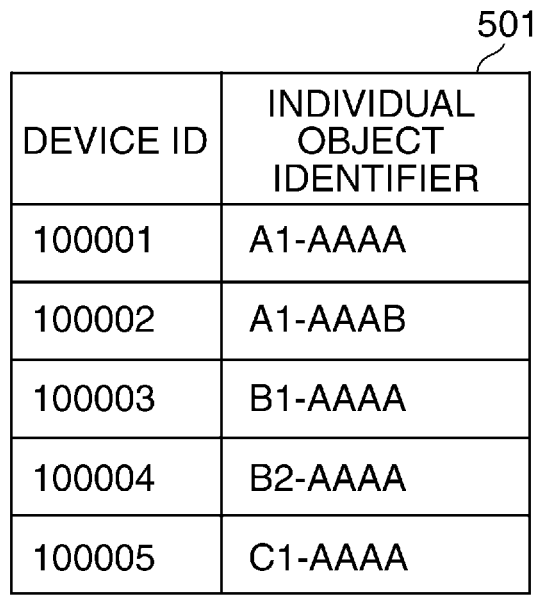
FIG. 6 is a table showing the contents of a registration management database included in the management data.

Referring to FIG. 6, the registration management database 501 is comprised of items of "device ID" and "individual object identifier", and these items are identification information for identifying each of apparatuses, e.g. the MFPs 102 and 103, that allow the synchronization of management target setting information with the server 101 (hereinafter referred to as the "synchronization allowing apparatus(es)").

The device ID is unique ID information assigned to each individual object identifier, and the individual object identifier is an identifier with which each synchronization allowing apparatus can be identified. The server 101 acquires the individual object identifier from each synchronization allowing apparatus when registering the synchronization allowing apparatus.

Figure 7:
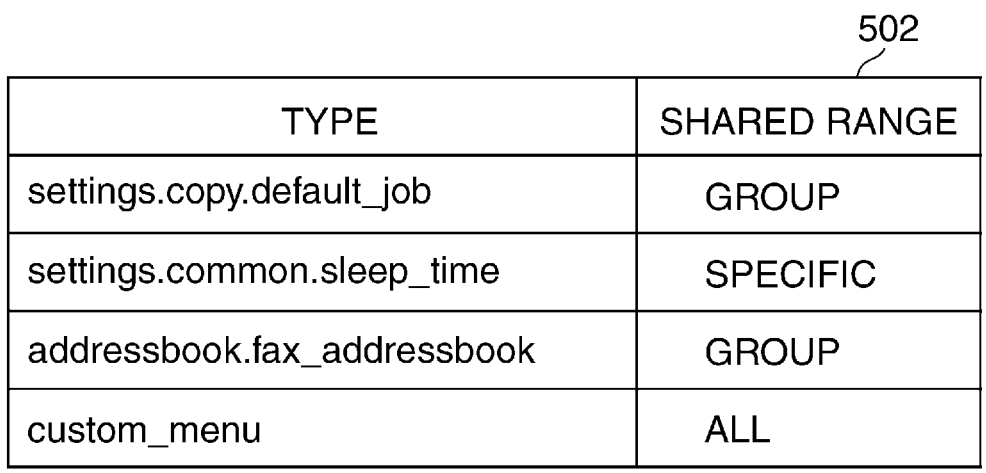
FIG. 7 is a table showing the contents of a shared range management database included in the management data.

Referring to FIG. 7, the shared range management database 502 is comprised of items of "type" and "shared range", and these items are information concerning a synchronization destination set for each type of management target setting information.

The type indicates a type of each piece of management target setting information, and the shared range indicates a shared range of the piece of management target setting information. As the shared range, there is set, for each type of management target setting information, one of "all" which indicates that all synchronization allowing apparatuses are set as the synchronization destination, "group" which indicates that a group of synchronization allowing apparatuses included in the group management database 503 is set as the synchronization destination, and "specific" which indicates that a specific synchronization allowing apparatus is set as the synchronization destination.

Figure 8:
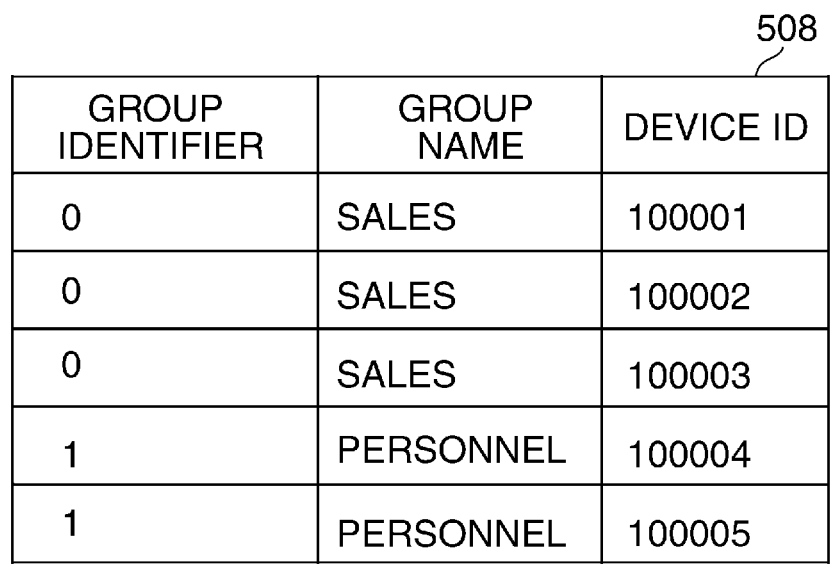
FIG. 8 is a table showing the contents of a group management database included in the management data.

Referring to FIG. 8, the group management database 503 is comprised of items of "group identifier", "group name", and "device ID".

The group management database 503 includes information (above-mentioned items) concerning a group to which each synchronization allowing apparatus belongs, and at least one synchronization allowing apparatus belongs to each group. The group identifier is unique ID information assigned to each group, and the group name is a name of each group. The device ID is ID information of a synchronization allowing apparatus belonging to each group, and the device ID of the group management database 503 and the device ID of the registration management database 501 are associated with each other.

Referring to FIG. 9, the setting information database 504 is comprised of items of "setting information identifier" and "data", and includes a specific value of each piece of management target setting information.

The setting information identifier is an identifier with which each piece of management target setting information and a shared range of the piece of management target setting information can be identified. In the present embodiment, a character string formed by adding a character string indicative of shared range information, such as "user" which represents "all", to the leading end of a character string indicative of the type of management target setting information, such as a character string indicative of the "type" of the shared range management database 502, is set as the setting information identifier. The data indicates a specific value of each piece of management target setting information.

When an instruction for updating each piece of management target setting information is input by a user's operation on the operation section 208, in response to the instruction, the editing module 401 appearing in FIG. 4 gives an instruction for executing update processing, to the data update module 405 and the group setting update module 407.

The display module 402 displays each piece of management target setting information and the shared range of the piece of management target setting information on the display section 209. The communication module 403 controls data communication with each synchronization allowing apparatus. With the control performed by the communication module 403, the server 101 receives, from a synchronization allowing apparatus, an instruction notification for the update of associated pieces of management target setting information and an instructing notification for the update of the shared range of each associated piece of management target setting information. The instruction notification includes an individual object identifier with which the synchronization allowing apparatus can be identified and type information indicative of the type of each associated piece of management target setting information to be updated. Further, with the control performed by the communication module 403, the server 101 transmits a notification concerning a result of execution of various processes based on the received instruction notification, to the synchronization allowing apparatus.

The data acquisition module 404 acquires an individual object identifier and type information included in the instruction notification transmitted from the synchronization allowing apparatus, and acquires "data" of the setting information database 504, which is associated with the acquired individual object identifier and type information, i.e. specific values of pieces of management target setting information. The data update module 405 updates the setting information database 504 based on the instruction for executing update processing, received from the editing module 401.

The group setting acquisition module 406 acquires type information included in the instruction notification transmitted from the synchronization allowing apparatus, and acquires "shared range" of the shared range management database 502, which is associated with the acquired type information. The group setting update module 407 updates the shared range management database 502 based on the instruction for executing update processing, received from the editing module 401.

The identifying module 408 identifies a synchronization allowing apparatus based on an individual object identifier included in the instruction notification transmitted from the synchronization allowing apparatus and the registration management database 501.

The data storage module 409 stores the setting information database 504 in the HDD 204, the group setting storage module 410 stores the shared range management database 502 in the HDD 204, and the management information storage module 411 stores the registration management database 501 in the HDD 204. In short, in the present embodiment, the management data 500 is managed by various processes performed by the management module 400, whereby the management target setting information acquired from the synchronization allowing apparatus is managed Although in the present embodiment, the case where the server 101 includes the management module 400 is described by way of example, the server 101 is not limitedly includes the management module 400, but one of the MFPs 102 and 103, for example, may include the management module 400. In this case, the MFP 102, for example, which includes the management module 400, can manage the management target setting information acquired from synchronization allowing apparatuses, by storing the management data 500 in the HDD 304 and managing the same.

Figure 10:
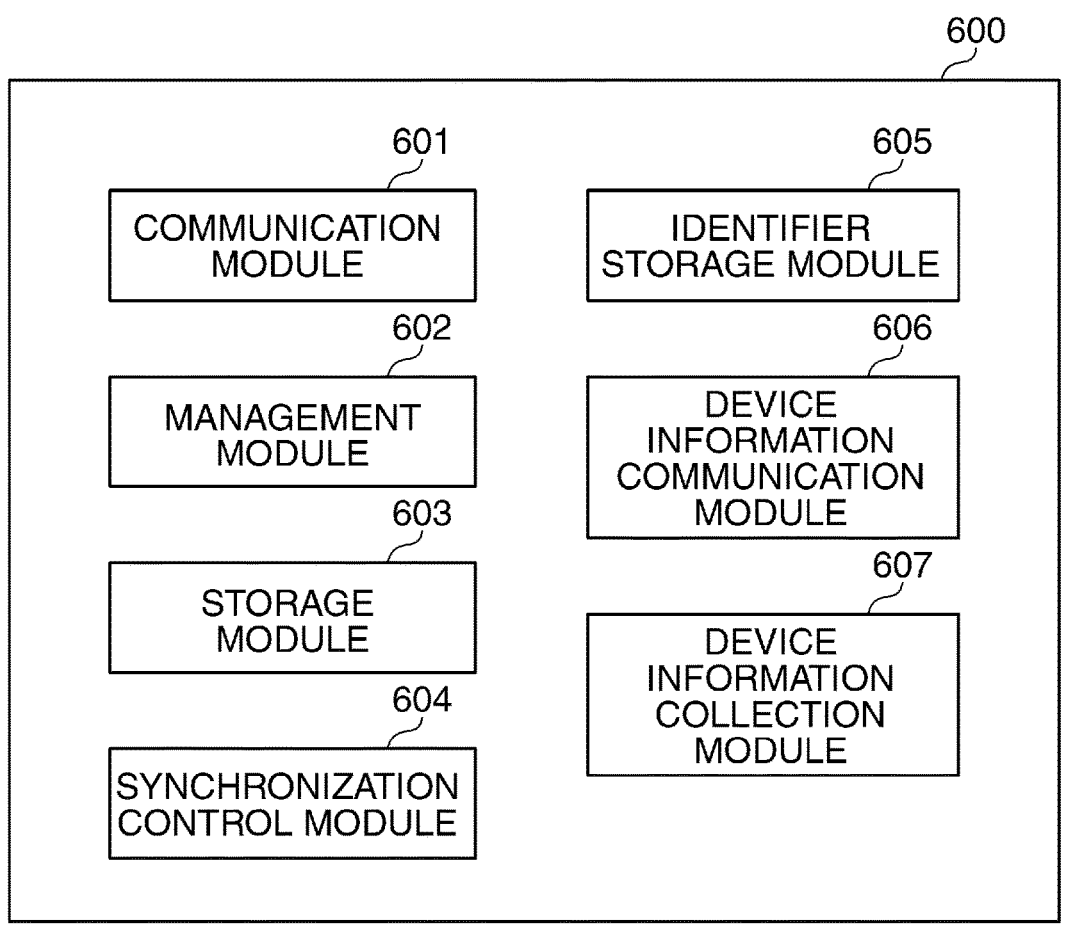
FIG. 10 is a schematic block diagram of software modules of the MFP appearing in FIG. 1.

FIG. 10 is a schematic block diagram of a software module 600 of the MFP 102 appearing in FIG. 1.

Referring to FIG. 10, the software module 600 includes a communication module 601, a management module 602, a storage module 603, a synchronization control module 604, and an identifier storage module 605. Further, the software module 600 includes a device information communication module 606 and a device information collection module 607. Various processes of the software module 600 are performed by the CPU 301 that executes various programs stored in the ROM 302.

The communication module 601 controls data communication with the server 101. The management module 602 manages data of pieces of management target setting information synchronized from the server 101, data of pieces of management target setting information updated by a user's operation on the console section 309, and the like. The storage module 603 stores the management target setting information in the HDD 304, and the synchronization control module 604 controls synchronization with the server 101. Synchronization processing is performed when the MFP 102 performs a predetermined operation, for example, when the MFP 102 starts, when the MFP 102 shifts to a sleep mode, when the MFP 102 returns from the sleep mode, and so forth, and further, synchronization processing is executed at predetermined fixed time intervals.

The identifier storage module 605 stores an individual object identifier with which the MFP 102 can be identified, in the HDD 304. The device information communication module 606 transmits device information of the MFP 102, including the individual object identifier, firmware version information, accessory configuration information, software license information, and so forth, to the server 101. The device information collection module 607 collects the device information of the MFP 102, and stores the collected device information e.g. in the HDD 304.

Figure 11:
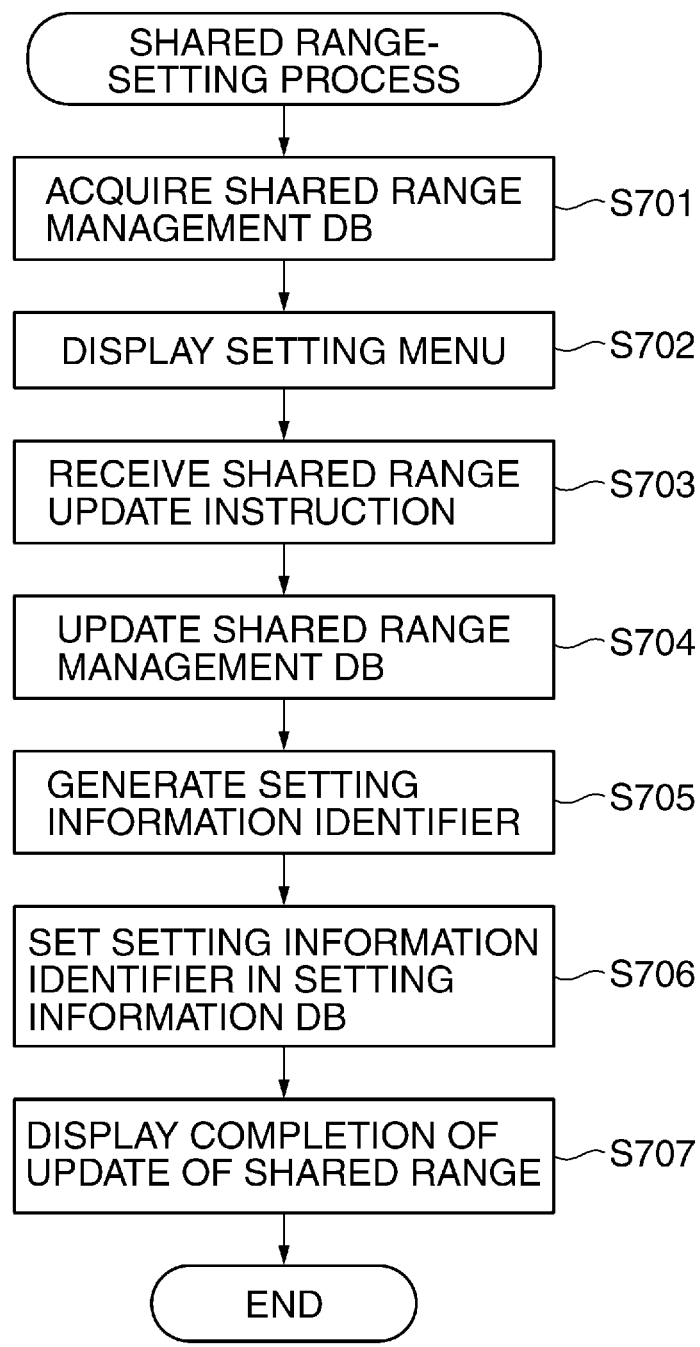
FIG. 11 is a flowchart of a shared range-setting process performed by the server appearing in FIG. 1.

FIG. 11 is a flowchart of a shared range-setting process performed by the server 101 appearing in FIG. 1.

The shared range-setting process in FIG. 11 is performed by the CPU 201 that executes the various programs stored in the ROM 202. Further, it is assumed here that the shared range-setting process is performed when an instruction for updating the shared range of management target setting information is provided by a user's operation on the operation section 208, as an example of the instruction for updating the shared range of management target setting information.

Here, in the conventional communication system, in setting the shared range of management target setting information, it is impossible to make a setting such that one piece of management target setting information is shared with all of a plurality of synchronization allowing apparatuses, and another piece of management target setting information is shared with only some of the plurality of synchronization allowing apparatuses. Further, in the conventional communication system, in a case where a new synchronization allowing apparatus is added to the communication system, a user cannot make a setting as to whether or not to share management target setting information with the added synchronization allowing apparatus. That is, in the conventional communication system, it is impossible to flexibly set a shared range of management target setting information according to the intention of a user.

In contrast, in the present embodiment, the shared range of management target setting information is set for each type of management target setting information. That is, the synchronization destination of the management target setting information can be changed for each type of the management target setting information.

Figure 12:
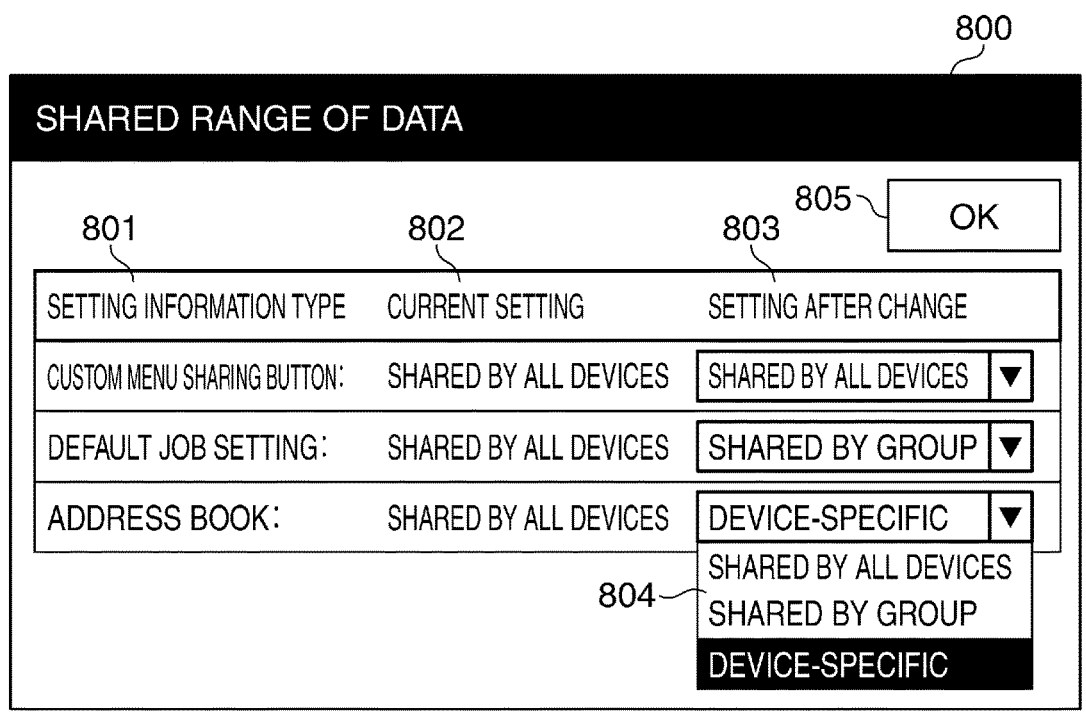
FIG. 12 is a diagram showing an example of a setting menu displayed on a display section appearing in FIG. 2.

Referring to FIG. 11, first, the CPU 201 acquires the shared range management database 502 (step S701), and displays the setting menu 800, shown in FIG. 12, for setting the shared range of management target setting information on the display section 209 based on the acquired shared range management database 502 (step S702). The setting menu 800 includes a setting information type 801, a current setting 802, a setting after change 803, a pull-down menu 804, and an OK button 805. The setting information type 801 indicates a type of management target setting information, and the current setting 802 indicates a shared range currently set when the setting menu 800 is displayed. In a case where the shared range has not been set when the setting menu 800 is displayed, a blank space, "-", or the like is set to appear. For the setting after change 803, the pull-down menu 804 (selection menu) which enables the user to select a shared range is displayed. The pull-down menu 804 displays three options: "shared by all devices" for setting all synchronization allowing apparatuses as the synchronization destination, which corresponds to "all" in the shared range of the shared range database 502, "shared by group" for setting a group managed by the group management database 503 as the synchronization destination, which corresponds to "group" in the shared range of the shared range database 502, and "device-specific" for setting a specific synchronization allowing apparatus as the synchronization destination, which corresponds to "specific" in the shared range of the shared range database 502.

The pull-down menu 804 includes options set for each type of management target setting information in advance, and includes a combination of the options, which is different depending on each type of management target setting information. Although the illustrated example of the pull-down menu 804 includes the above three options, the pull-down menu 804 may include only "device-specific" of the plurality of pieces of management target setting information, as the option for one type of management target setting information, and include two options of "shared by all devices" and "shared by group", as the options for another type of management target setting information. In the present embodiment, a user can set a desired synchronization allowing apparatus for each type of management target setting information, as the synchronization destination of management target setting information, using the setting menu 800. The OK button 805 is a set button for finalizing the setting of the shared range of each management target setting information.

Then, the CPU 201 waits until the OK button 805 is selected, and when the OK button 805 is selected, the CPU 201 receives an instruction for updating a shared range of management target setting information (step S703). Then, the CPU 201 updates the shared range of the shared range management database 502 based on the received instruction (step S704), and generates a setting information identifier of the setting information database 504 based on the updated shared range of the shared range management database 502 (step S705). Then, the CPU 201 sets the generated setting information identifier in the setting information database 504 (step S706). This completes the update of the shared range of management target setting information based on the above instruction. Then, the CPU 201 displays a message to the effect that the update of the shared range of the management target setting information based on the above instruction is completed on the display section 209 (step S707), followed by terminating the present process.

According to the above-described shared range-setting process in FIG. 11, in the server 101 that stores a plurality of types of management target setting information, a desired synchronization allowing apparatus is set for each type of management target setting information as a synchronization destination of the type of management target setting information. This enables the user to set a synchronization allowing apparatus as a synchronization destination of management target setting information, as desired by the user, for each type of management target setting information, whereby it is possible to flexibly set a synchronization destination of management target setting information according to the intention of the user.

Further, according to the above-described shared range-setting process in FIG. 11, the pull-down menu 804 for setting a desired synchronization allowing apparatus for each type of management target setting information as a synchronization destination of the type of management target setting information is displayed. The pull-down menu 804 includes the options of "shared by all devices" for setting all synchronization allowing apparatuses as the synchronization destination, and "device-specific" for setting a specific synchronization allowing apparatus as the synchronization destination. This enables the user to easily set, for each type of management target setting information, whether to set all synchronization allowing apparatuses as the synchronization destination or to set a specific synchronization allowing apparatus as the same.

Further, in the above-described shared range-setting process in FIG. 11, the pull-down menu 804 includes a combination of options, which is different depending on each type of management target setting information. This enables the user to select a desired option from a combination of the options according to the type of management target setting information, whereby it is possible to set a proper synchronization allowing apparatus suitable for the type of the management target setting information as the synchronization destination.

In the above-described shared range-setting process in FIG. 11, the management target setting information includes information used for various processes performed by each synchronization allowing apparatus, and hence it is possible to flexibly set a synchronization destination of information used for various processes performed by each synchronization allowing apparatus, according to the intention of a user.

While the present invention has been described with reference to exemplary embodiments, it is to be understood that the invention is not limited to the disclosed exemplary embodiments.

For example, the shared range set for each type of management target setting information may be managed using management data 900 described below with reference to FIG. 13.

Figure 13:
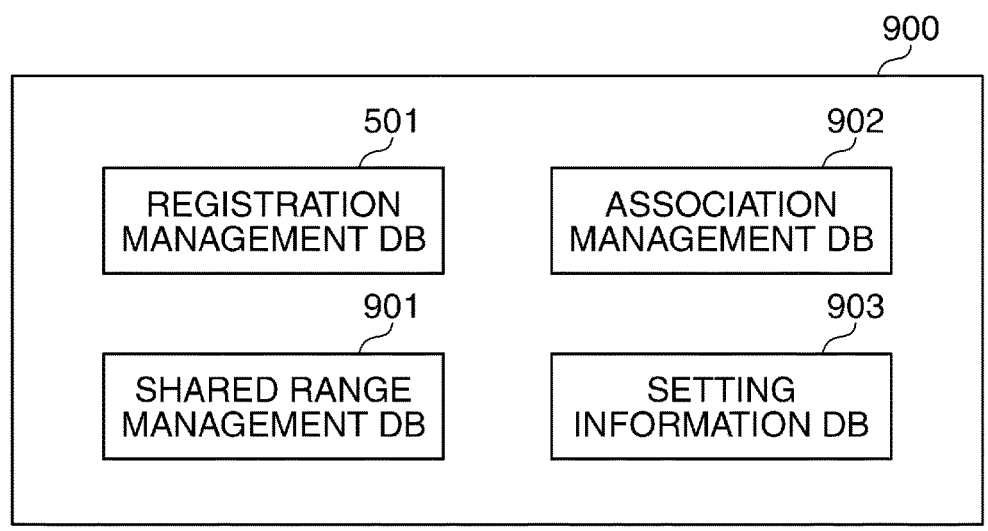
FIG. 13 is a schematic block diagram of management data used by the server appearing in FIG. 1.

Referring to FIG. 13, the management data 900 includes the registration management database 501 appearing in FIG. 5, as well as a shared range management database 901, an association management database 902, and a setting information database 903.

Referring to FIG. 14, the shared range management database 901 includes items of "shared range ID", "group identifier", "group name", "device ID", "type", and "shared range".

The shared range management database 901 includes information concerning a shared range set for each type of management target setting information. The shared range ID is ID information uniquely assigned to a shared range set for each type of management target setting information in the shared range management database 901, the group identifier is ID information uniquely assigned to each group, and the device ID is ID information with which each synchronization allowing apparatus can be identified. The type indicates a type of management target setting information, and the shared range indicates a shared range set for the type of management target setting information.

Figure 15:
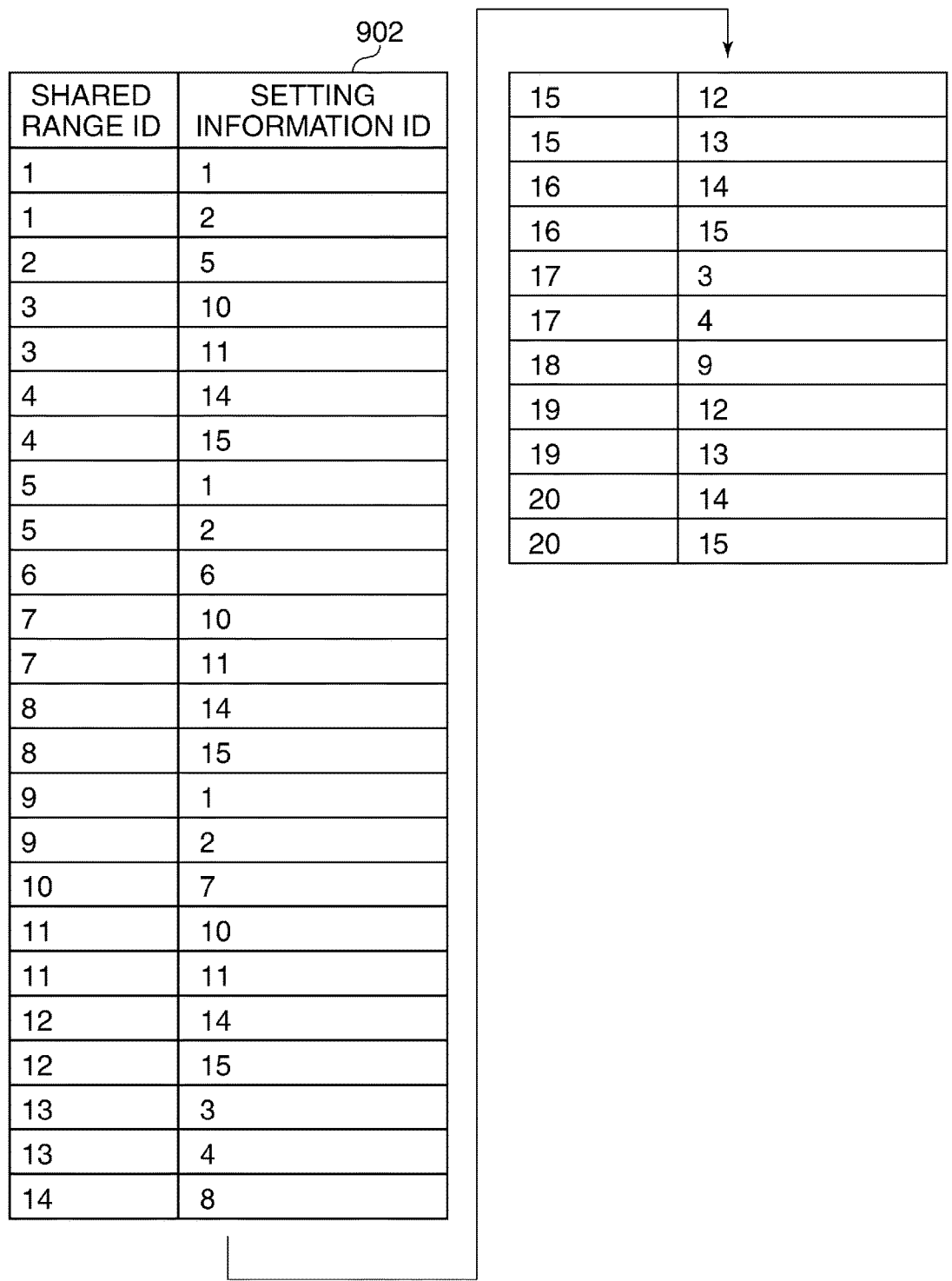
FIG. 15 is a table showing the contents of an association management database included in the management data.

Referring to FIG. 15, the association management database 902 includes items of "shared range ID" and "setting information ID", and associates the shared range IDs of the shared range management database 901 and setting information IDs of the setting information database 903, described hereafter with reference to FIG. 16, with each other, respectively.

As the shared range ID, there is set ID information corresponding to a shared range ID in the shared range management database 901, and as the setting information ID, there is set a setting information ID which is ID information of a piece of management target setting information associated with the shared range ID and is set forth in the setting information database 903.

Referring to FIG. 16, the setting information database 903 includes items of "setting information ID", "setting information identifier", and "data", and includes a specific value of each piece of management target setting information.

The setting information ID is ID information uniquely assigned to each piece of management target setting information in the setting information database 903, and the setting information identifier is an identifier for identifying a type of management target setting information. The data indicates a specific value of each piece of management target setting information. By using the management data 900, when updating the shared range set for each type of management target setting information, it is possible to eliminate the need of updating the two types of data of the shared range management database 502 and the setting information database 504. As a consequence, it is possible to easily perform the process for updating the shared range set for each type of management target setting information, in a simplified manner, without performing complicated data management than in the case where the management data 500 is used.

Further, in the present embodiment, part of the information included in the setting information database 903 may be deleted based on the updated contents of the shared range set for each type of management target setting information.

Figure 17:
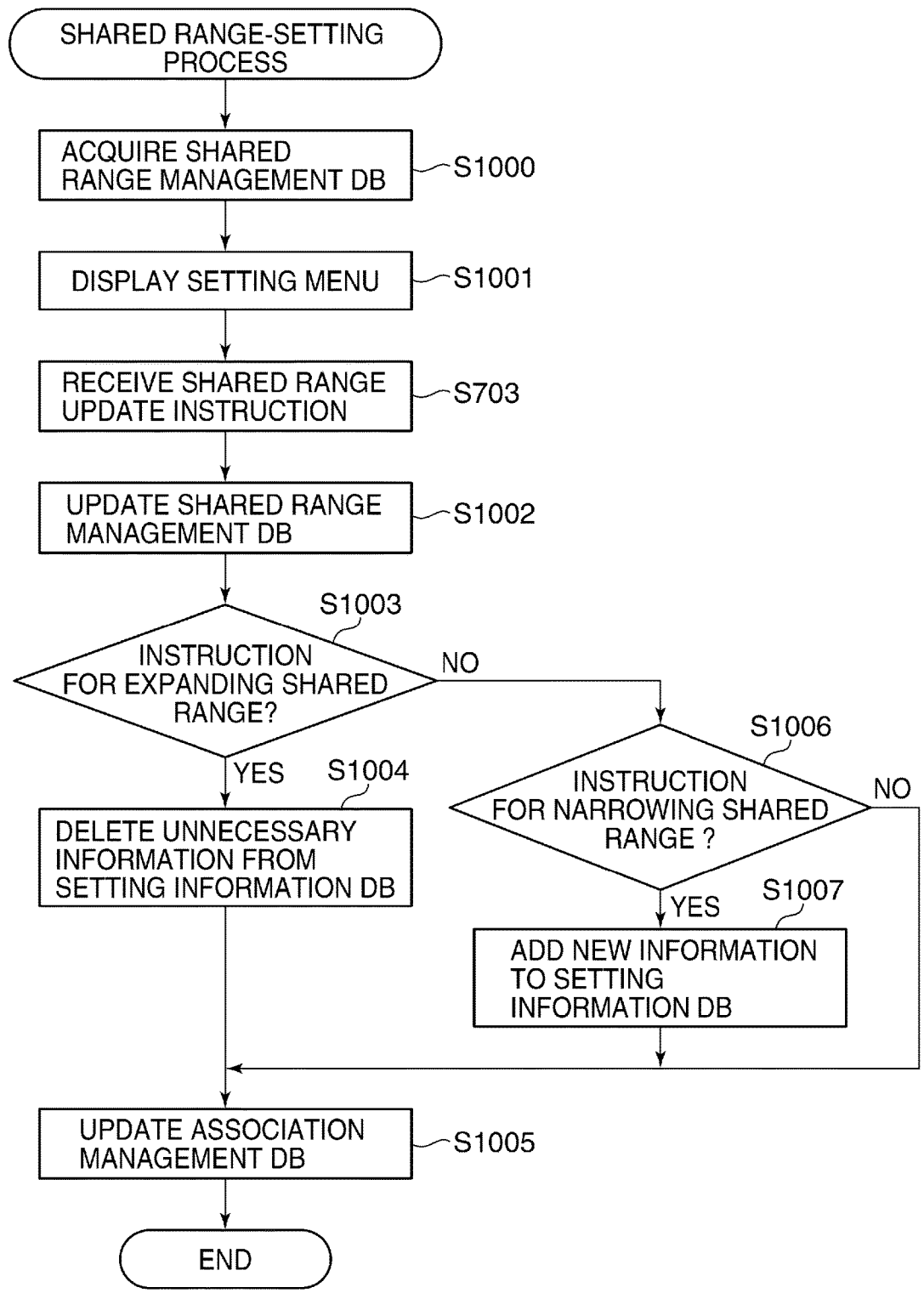
FIG. 17 is a flowchart of a first variation of the shared range-setting process in FIG. 11.

FIG. 17 is a flowchart of a first variation of the shared range-setting process in FIG. 11.

The first variation of the shared range-setting process in FIG. 17 is performed by the CPU 201 that executes various programs stored in the ROM 202. Further, it is assumed here that the first variation of the shared range setting process in FIG. 17 is performed when an instruction for updating the shared range of management target setting information is provided by a user's operation on the operation section 208, by way of example.

Referring to FIG. 17, first, the CPU 201 acquires the shared range management database 901 appearing in FIG. 13 (step S1000). Next, the CPU 201 displays the setting menu 800 for setting the shared range of management target setting information on the display section 209 based on the acquired shared range management database 901 (step S1001). Then, the CPU 201 performs the same processing as in the step S703 in FIG. 11. Then, the CPU 201 updates the shared range management database 901 based on the update instruction received in the step S703 (step S1002). Then, the CPU 201 determines whether or not the update instruction received in the step S703 is an instruction for expanding the shared range (step S1003). For example, assuming that the currently set shared range is "device-specific", if the update instruction includes an instruction for updating the shared range to "shared by group" or "shared by all devices", the CPU 201 determines that the update instruction is an instruction for expanding the shared range. On the other hand, assuming that the currently set shared range is "shared by all devices", if the update instruction received in the step S703 is an instruction for updating the shared range to "shared by group" or "device-specific", the CPU 201 determines that the update instruction received in the step S703 is an instruction for narrowing the shared range.

If it is determined in the step S1003 that the update instruction is an instruction for expanding the shared range, the CPU 201 deletes information which becomes unnecessary due to the update of the shared range (step S1004). Here, a case where the shared range of a setting information identifier "settings.copy.default_job.copy.dual-side" is updated from "shared by group" to "shared by all devices" will be described by way of example. In this case, all synchronization allowing apparatuses come to share management target setting information corresponding to the above-mentioned setting information identifier, and hence only one type of management target setting information is used. Therefore, in the setting information database 903, one of pieces of information indicated by the setting information IDs "1" and "3" becomes unnecessary. If unnecessary information is left without being deleted from the setting information database 903, the volume of data of the setting information database 903 becomes larger than necessary. To cope with this, in the present embodiment, the CPU 201 deletes, in the step S1004, one of the pieces of information indicated by the setting information IDs "1" and "3", which is used by the least number of synchronization allowing apparatuses, for example, the information indicated by the setting information ID "3". By deleting the unnecessary information, the setting information database 903 is updated from that shown in FIG. 16 to that shown in FIG. 18, whereby it is possible to prevent the volume of data of the setting information database 903 from becoming larger than necessary.

Then, the CPU 201 updates the association management database 902 based on the updated contents of the setting information database 903 (step S1005), followed by terminating the present process.

If it is determined in the step S1003 that the update instruction received in the step S703 is not an instruction for expanding the shared range, the CPU 201 determines whether or not the update instruction is an instruction for narrowing the shared range (step S1006). If it is determined that the update instruction is an instruction for narrowing the shared range, the CPU 201 adds new information which becomes necessary due to the update of the shared range, to the setting information database 903 (step S1007). Here, a case where the shared range of the setting information identifiers "settings.copy.default_job.copy.dual-side" and "settings.copy.default_job.copy.staple" is updated from "shared by group" to "device-specific" will be described by way of example. In this case, each synchronization allowing apparatus does not share the management target setting information, and hence a plurality of types of management target setting information associated with the above-mentioned setting information identifier are required. To cope with this, in the present embodiment, in addition to information indicated by the setting information IDs "1" to "4", the CPU 201 adds information indicated by the setting information IDs "16" to "21", as shown in FIG. 19, in the step S1007. The CPU 201 sets information based on the user's update instruction, an initial value set in advance, or the like, to each item of data of the setting information IDs "16" to "21".

Then, after execution of the step S1006, the CPU 201 executes the step S1005, followed by terminating the present process. Further, if it is determined in the step S1006 that the update instruction is not an instruction for narrowing the shared range, the process directly proceeds to the step S1005, followed by terminating the present process.

Next, a description will be given of a synchronization-related process for performing various processes related to synchronization processing based on the set shared range of management target setting information.

Figure 20A:
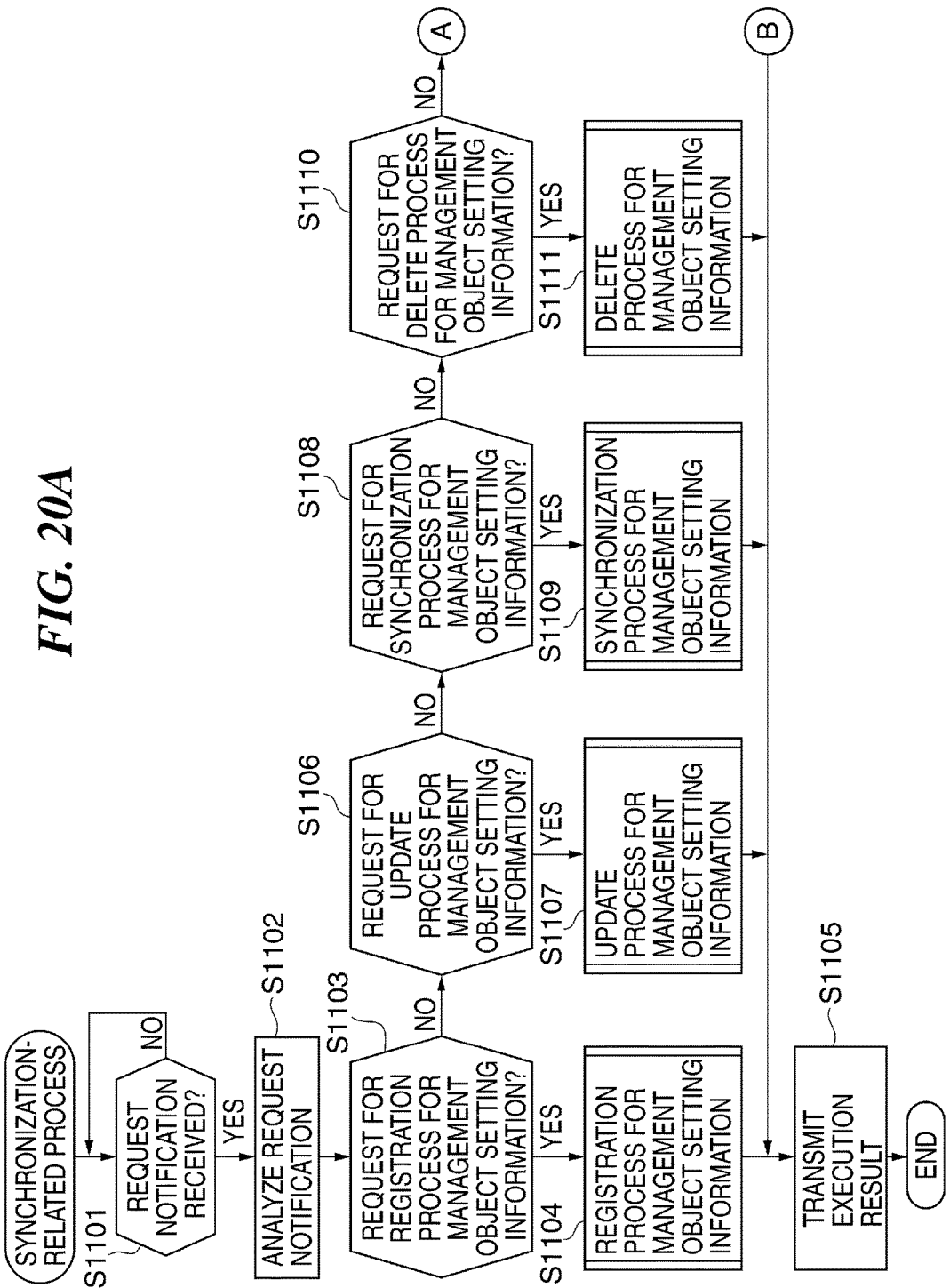
FIGS. 20A and 20B are a flowchart of a synchronization-related process performed by the server appearing in FIG. 1.
Figure 20B:
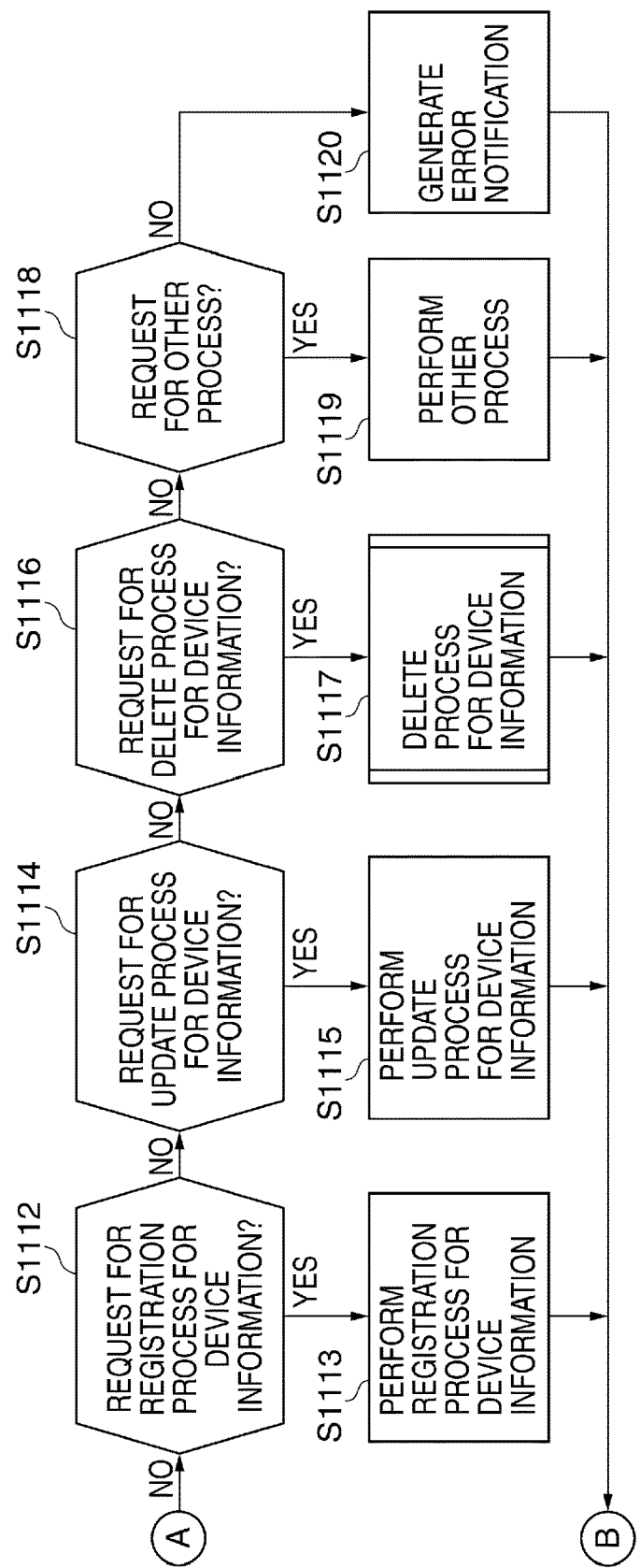

FIGS. 20A and 20B are a flowchart of the synchronization-related process performed by the server 101 appearing in FIG. 1.

The synchronization-related process in FIGS. 20A and 20B is performed by the CPU 201 that executes various programs stored in the ROM 202.

Referring to FIGS. 20A and 20B, first, the CPU 201 waits until a request notification for requesting execution of the various processes related to synchronization processing is received from a synchronization allowing apparatus (step S1101). The various processes related to synchronization processing includes, for example, a registration process for registering management target setting information, an update process for updating management target setting information, a synchronization process for synchronizing management target setting information, a delete process for deleting management target setting information, a registration process for registering device information, an update process for updating device information, and a delete process for deleting device information. Then, upon receipt of the above-mentioned request from a synchronization allowing apparatus e.g. the MFP 102 (YES to the step S1101), the CPU 201 analyzes the received request notification (step S1102). Then, the CPU 201 determines whether or not the received request notification is a request for performing the registration process for registering management target setting information (step S1103).

If it is determined in the step S1103 that the received request notification is a request for performing the registration process for registering management target setting information, the CPU 201 performs the registration process for registering management target setting information, described hereinafter with reference to FIG. 21 (step S1104). More specifically, the CPU 201 sets a new piece of management target setting information based on the request notification. Then, the CPU 201 transmits a result of execution of the registration process based on the request notification, to the MFP 102 (step S1105), followed by terminating the present process.

If it is determined in the step S1103 that the received request notification is not a request for performing the registration process for registering management target setting information, the CPU 201 determines whether or not the received request notification is a request for performing the update process for updating management target setting information (step S1106).

If it is determined in the step S1106 that the received request notification is a request for performing the update process for updating management target setting information, the CPU 201 performs the update process for updating management target setting information, described hereinafter with reference to FIG. 22 (step S1107). More specifically, the CPU 201 updates the management target setting information based on the request notification. Then, the CPU 201 executes the step S1105. On the other hand, if it is determined in the step S1106 that the received request notification is not a request for performing the update process for updating management target setting information, the CPU 201 determines whether or not the received request notification is a request for performing the synchronization process for synchronizing management target setting information (step S1108).

If it is determined in the step S1108 that the received request notification is a request for performing the synchronization process for synchronizing management target setting information, the CPU 201 performs the synchronization process for synchronizing management target setting information, described hereinafter with reference to FIG. 23 (step S1109). More specifically, the CPU 201 synchronizes the management target setting information with the MFP 102 based on the request notification. Then, the CPU 201 executes the step S1105. On the other hand, if it is determined in the step S1108 that the received request notification is not a request for performing the synchronization process for synchronizing management target setting information, the CPU 201 determines whether or not the received request notification is a request for performing the delete process for deleting management target setting information (step S1110).

If it is determined in the step S1110 that the received request notification is a request for performing the delete process for deleting management target setting information, the CPU 201 performs the delete process for deleting management target setting information, described hereinafter with reference to FIG. 24 (step S1111). More specifically, the CPU 201 deletes the management target setting information based on the request notification. Then, the CPU 201 executes the step S1105. On the other hand, if it is determined in the step S1110 that the received request notification is not a request for performing the delete process for deleting management target setting information, the CPU 201 determines whether or not the received request notification is a request for performing the registration process for registering device information (step S1112).

If it is determined in the step S1112 that the received request notification is a request for performing the registration process for registering device information, the CPU 201 performs the registration process for registering device information (step S1113), and executes the step S1105. On the other hand, if it is determined in the step S1112 that the received request notification is not a request for performing the registration process for registering device information, the CPU 201 determines whether or not the received request notification is a request for performing the update process for updating device information (step S1114).

If it is determined in the step S1114 that the received request notification is a request for performing the update process for updating device information, the CPU 201 performs the update process for updating device information (step S1115), and executes the step S1105. On the other hand, if it is determined in the step S1114 that the received request notification is not a request for performing the update process for updating device information, the CPU 201 determines whether or not the received request notification is a request for performing the delete process for deleting device information (step S1116).

If it is determined in the step S1116 that the received request notification is a request for performing the delete process for deleting device information, the CPU 201 performs the delete process for deleting device information, described hereinafter with reference to FIG. 25, to delete the device information based on the request notification (step S1117), and executes the step S1105. On the other hand, if it is determined in the step S1116 that the received request notification is not a request for performing the delete process for deleting device information, the CPU 201 determines whether or not the received request notification is a request for performing any other process set in advance (step S1118).

If it is determined in the step S1118 that the received request notification is a request for performing another process set in advance, the CPU 201 performs the other process based on the request notification (step S1119), and executes the step S1105. On the other hand, if it is determined in the step S1118 that the received request notification is not a request for performing any other process set in advance, the CPU 201 generates an error notification containing an error message (step S1120), and executes the step S1105.

Figure 21:
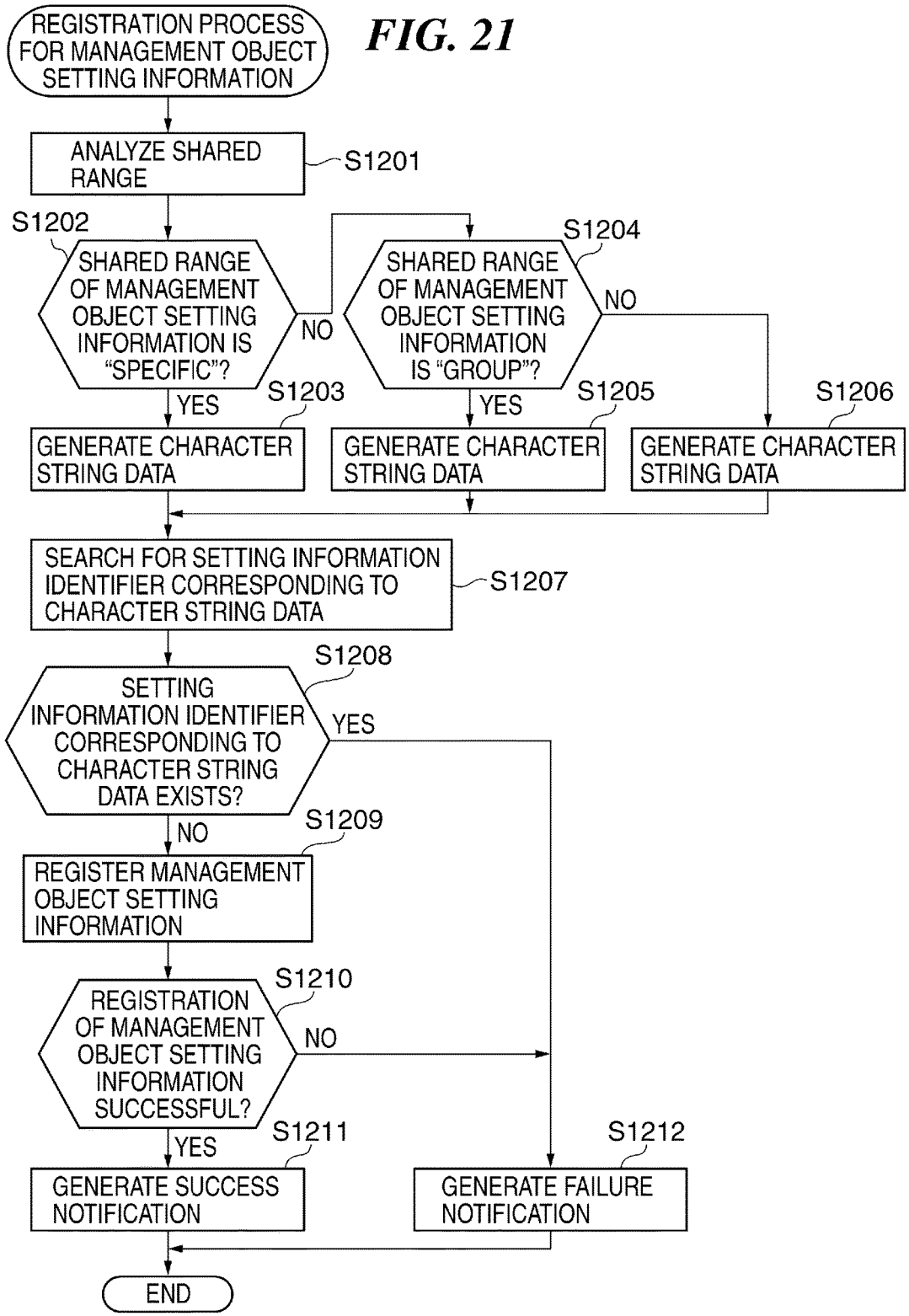
FIG. 21 is a flowchart of a registration process performed in a step in FIG. 20A, for registering management target setting information.

FIG. 21 is a flowchart of the registration process performed in the step S1104 in FIG. 20A, for registering management target setting information.

The registration process in FIG. 21 is performed by the CPU 201 that executes the various programs stored in the ROM 202. It is assumed that the registration process in FIG. 21 is performed using the management data 500, by way of example.

Referring to FIG. 21, first, the CPU 201 analyzes the shared range of management target setting information associated with the request notification, based on the acquired request notification and the shared range management database 502 (step S1201). Then, the CPU 201 determines whether or not the shared range of the management target setting information is "specific" (step S1202).

If it is determined in the step S1202 that the shared range of the management target setting information is "specific", the CPU 201 generates character string data including a character string indicating that the shared range is "specific" (step S1203). For example, the CPU 201 generates character string data formed by arranging a character string indicating that the shared range is "specific", the device ID of the MFP 102, and a character string indicating the type of the management target setting information, in the mentioned order. Then, the CPU 201 executes a step S1207, described hereinafter.

If it is determined in the step S1202 that the shared range of the management target setting information is not "specific", the CPU 201 determines whether or not the shared range of the management target setting information is "group" (step S1204).

If it is determined in the step S1204 that the shared range of the management target setting information is "group", the CPU 201 generates character string data including a character string indicating that the shared range is "group" (step S1205). For example, the CPU 201 generates character string data formed by arranging the character string indicating that the shared range is "group", the group identifier of the MFP 102, and the character string indicating the type of the management target setting information, in the mentioned order. Then, the CPU 201 executes the step S1207, described hereinafter.

If it is determined in the step S1204 that the shared range of the management target setting information is not "group", the CPU 201 generates character string data including a character string indicating that the shared range is "all" (step S1206). For example, the CPU 201 generates character string data formed by arranging the character string indicating that the shared range is "all", and the character string indicating the type of the management target setting information, in the mentioned order. Then, the process proceeds to the step S1207, wherein the CPU 201 searches the setting information database 504 for a setting information identifier corresponding to the generated character string data, using the generated character string data. Then, the CPU 201 determines whether or not a setting information identifier corresponding to the generated character string data exists (step S1208).

If it is determined in the step S1208 that a setting information identifier corresponding to the generated character string data does not exist, the CPU 201 makes an entry of a new piece of management target setting information in the setting information database 504, using the generated character string data as a setting information identifier (step S1209). Then, the CPU 201 determines whether or not the registration of the management target setting information is successful (step S1210).

If it is determined in the step S1210 that the registration of the management target setting information is successful, the CPU 201 generates a success notification to the effect that the registration of the management target setting information is successful (step S1211), followed by terminating the present process and proceeding to the step 1105 in FIG. 20A.

If it is determined in the step S1208 that a setting information identifier corresponding to the generated character string data exists, or if it is determined in the step S1210 that registration of the management target setting information is unsuccessful, the CPU 201 generates a failure notification to the effect that registration of the management target setting information is unsuccessful (step S1212), followed by terminating the present process and proceeding to the step 1105 in FIG. 20A.

Figure 22:
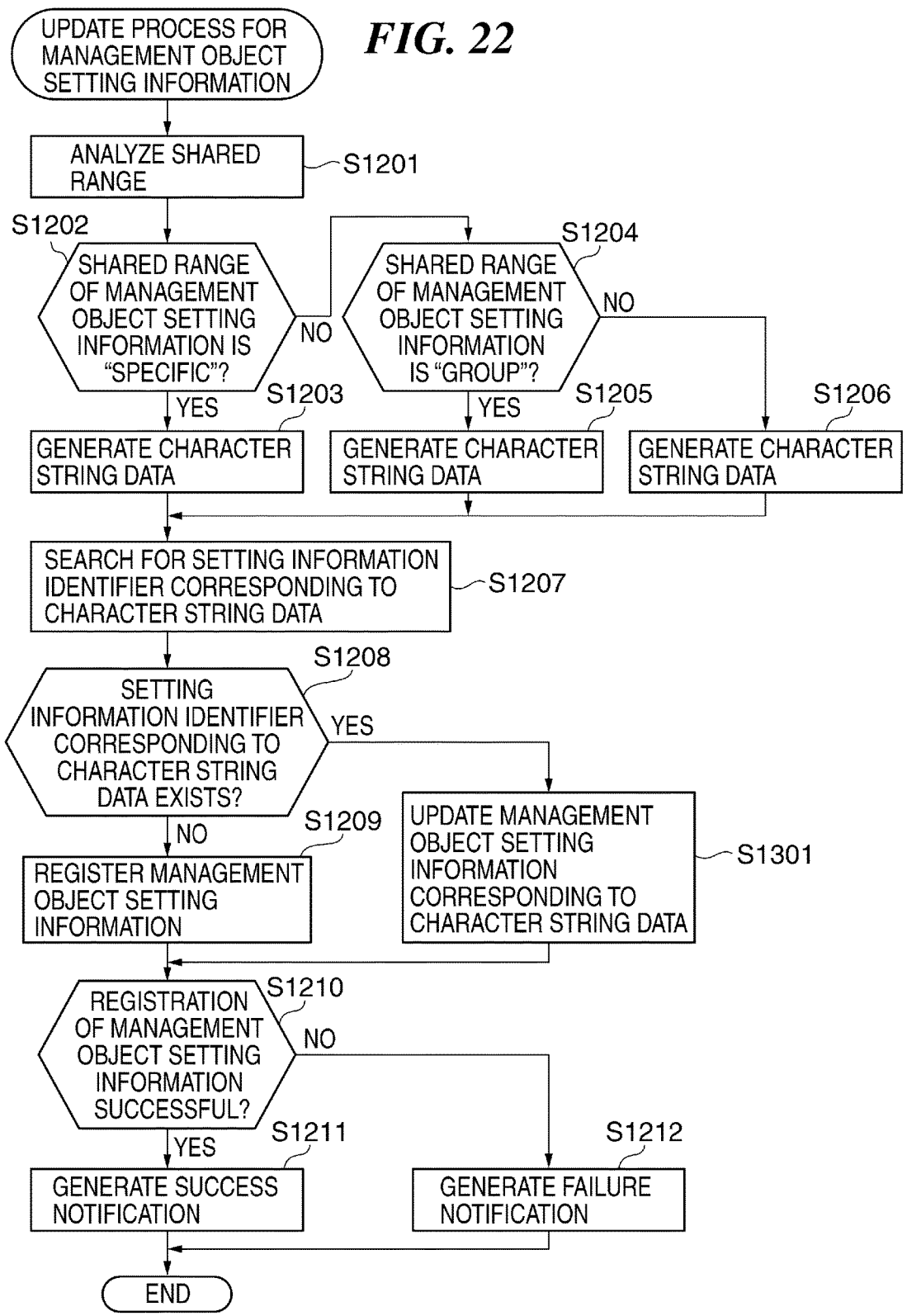
FIG. 22 is a flowchart of an update process performed in a step in FIG. 20A, for updating management target setting information.

FIG. 22 is a flowchart of the update process performed in the step S1107 in FIG. 20A, for updating management target setting information.

The update process in FIG. 22 is performed by the CPU 201 that executes the various programs stored in the ROM 202. It is assumed that the update process in FIG. 22 is performed using the management data 500, by way of example.

Referring to FIG. 22, first, the CPU 201 performs the same processing as in the steps S1201 to S1208 in FIG. 21.

If it is determined in the step S1208 that a setting information identifier corresponding to the generated character string data does not exist, the CPU 201 executes the same processing as in the step S1209 et seq. in FIG. 21. On the other hand, if it is determined in the step S1208 that a setting information identifier corresponding to the generated character string data exists, the CPU 201 updates the management target setting information corresponding to the character string data, in the setting information database 504 (step S1301). More specifically, the CPU 201 overwrites the management target setting information corresponding to the character string data in the setting information database 504, with the management target setting information based on the request notification. Then, the CPU 201 performs the same processing as in the step S1210 et seq. in FIG. 21.

Figure 23:
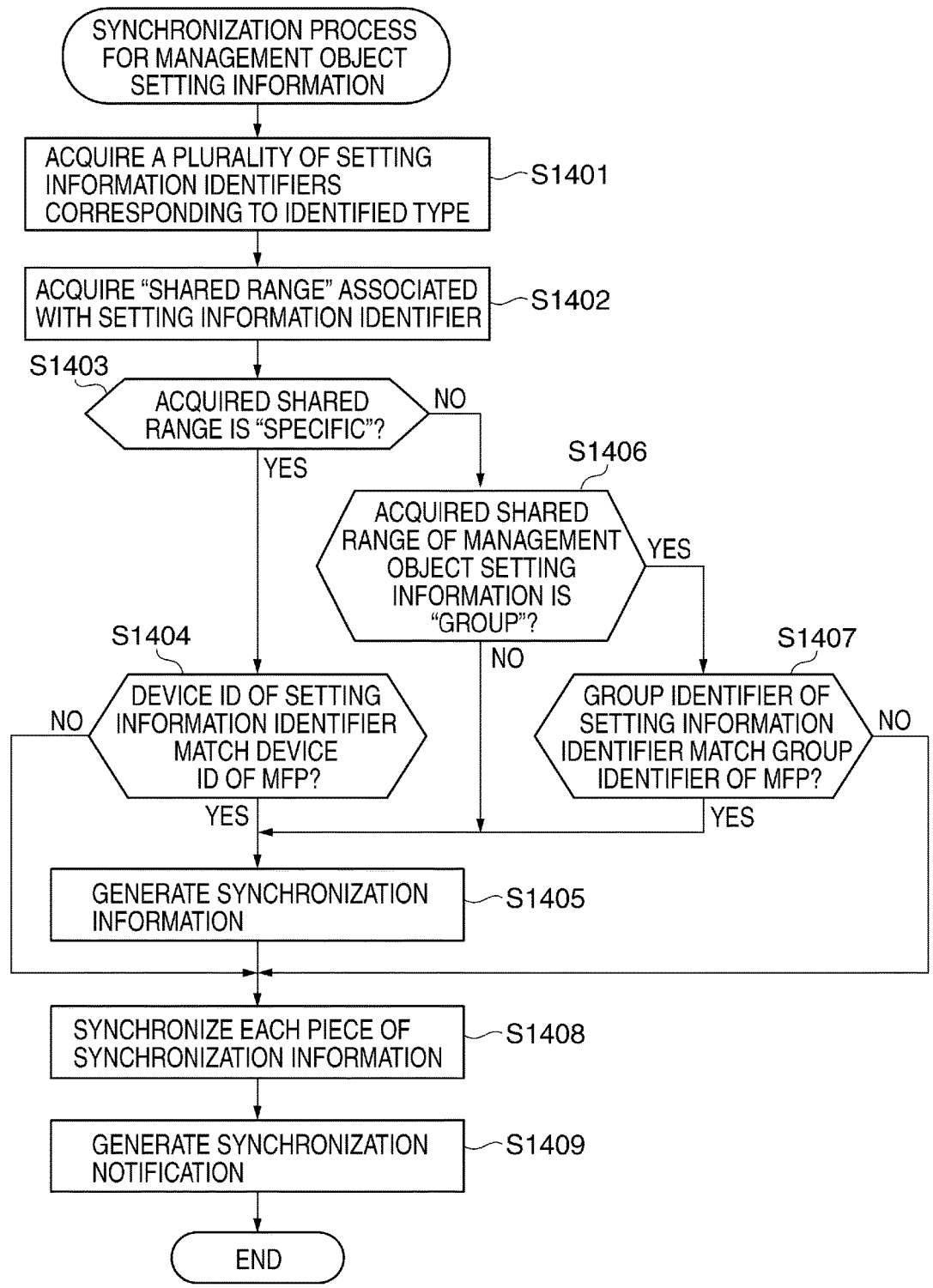
FIG. 23 is a flowchart of a synchronization process performed in a step in FIG. 20A, for synchronizing management target setting information.

FIG. 23 is a flowchart of the synchronization process performed in the step S1109 in FIG. 20A, for synchronizing management target setting information.

The synchronization process in FIG. 23 is performed by the CPU 201 that executes the various programs stored in the ROM 202. It is assumed that the synchronization process in FIG. 23 is performed using the management data 500, by way of example.

Referring to FIG. 23, first, the CPU 201 identifies a type of management target setting information based on the request notification, and acquires a plurality of setting information identifiers corresponding to the identified type from the setting information database 504 (step S1401). Then, the CPU 201 executes steps S1402 to S1407, described hereinafter, with respect to each of the acquired setting information identifiers. In the following description, a case where the steps S1402 to S1407 are executed with respect to a setting information identifier A as one of the plurality of setting information identifiers will be described by way of example. The CPU 201 acquires the shared range of the setting information identifier A based on the shared range management database 502 (step S1402), and determines whether or not the acquired shared range is "specific" (step S1403).

If it is determined in the step S1403 that the acquired shared range is "specific", the CPU 201 determines whether or not the device ID of the setting information identifier A matches the device ID of the MFP 102 (step S1404).

If it is determined in the step S1404 that the device ID of the setting information identifier A matches the device ID of the MFP 102, the CPU 201 generates synchronization information A (step S1405). The synchronization information A is generated based on management target setting information associated with the setting information identifier A. Then, the CPU 201 executes a step S1408, described hereinafter.

If it is determined in the step S1403 that the acquired shared range is not "specific", the CPU 201 determines whether or not the acquired shared range is "group" (step S1406).

If it is determined in the step S1406 that the acquired shared range is "group", the CPU 201 determines whether or not the group identifier of the setting information identifier A matches the group identifier of the MFP 102 (step S1407).

If it is determined in the step S1407 that the group identifier of the setting information identifier A matches the group identifier of the MFP 102, the CPU 201 executes the step S1405 et seq.

If it is determined in the step S1404 that the device ID of the setting information identifier A does not match the device ID of the MFP 102, or if it is determined in the step S1407 that the group identifier of the setting information identifier A does not match the group identifier of the MFP 102, the CPU 201 executes the step S1408, described hereinafter.

If it is determined in the step S1406 that the acquired shared range is not "group", the CPU 201 executes the step S1405. The CPU 201 executes the steps S1402 to S1407 also with respect to the setting information identifiers other than the setting information identifier A. Then, the CPU 201 synchronizes each piece of generated synchronization information with the MFP 102 (step S1408), and when all pieces of synchronization information have been synchronized with the MFP 102, the CPU 201 generates a synchronization notification to the effect that all pieces of synchronization information have been synchronized with the MFP 102 (step S1409), followed by terminating the present process and proceeding to the step 1105 in FIG. 20A.

Although in the above-described embodiment, the description is given of the case where synchronization processing is performed in the step S1408, this is not limitative. Synchronization processing may be performed in the step S1105 without executing the step S1408.

Figure 24:
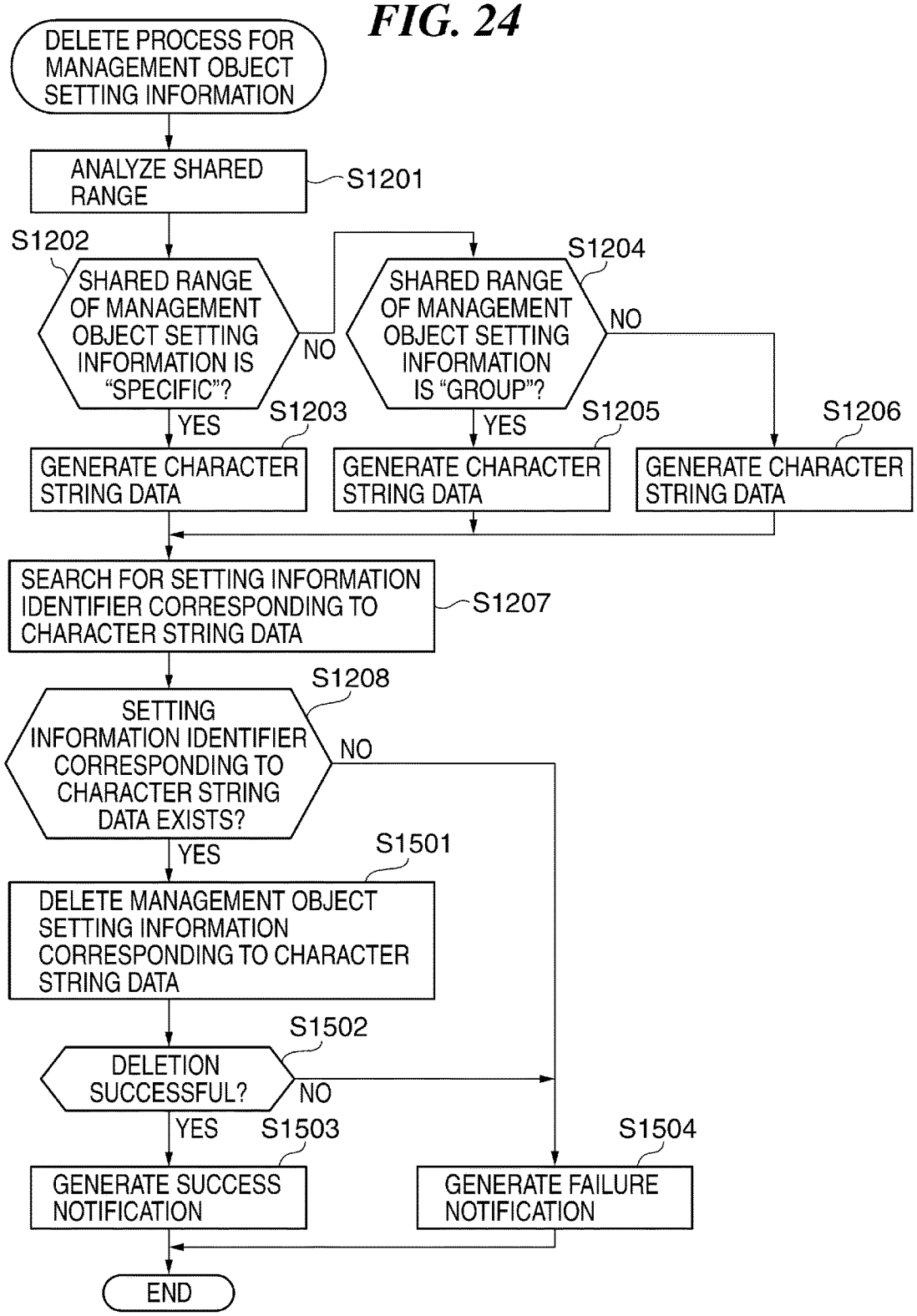
FIG. 24 is a flowchart of a delete process performed in a step in FIG. 20A, for deleting management target setting information.

FIG. 24 is a flowchart of the delete process performed in the step S1111 in FIG. 20A, for deleting management target setting information.

The delete process in FIG. 24 is performed by the CPU 201 that executes the various programs stored in the ROM 202. It is assumed that the delete process in FIG. 24 is performed using the management data 500, by way of example.

Referring to FIG. 24, first, the CPU 201 performs the same processing as in the steps S1201 to S1208 in FIG. 21. Then, if it is determined in the step S1208 that a setting information identifier corresponding to the generated character string data exists, the CPU 201 deletes the management target setting information associated with the setting information identifier corresponding to the character string data, from the setting information database 504 (step S1501). Then, the CPU 201 determines whether or not the deletion of the management target setting information is successful (step S1502).

If it is determined in the step S1502 that the deletion is successful, the CPU 2011 generates a success notification to the effect that the deletion is successful (step S1503), followed by terminating the present process and proceeding to the step 1105 in FIG. 20A. On the other hand, if it is determined in the step S1502 that the deletion of the management target setting information is unsuccessful, the CPU 201 generates a failure notification to the effect that the deletion is unsuccessful (step S1504), followed by terminating the present process and proceeding to the step 1105 in FIG. 20A.

Figure 25:
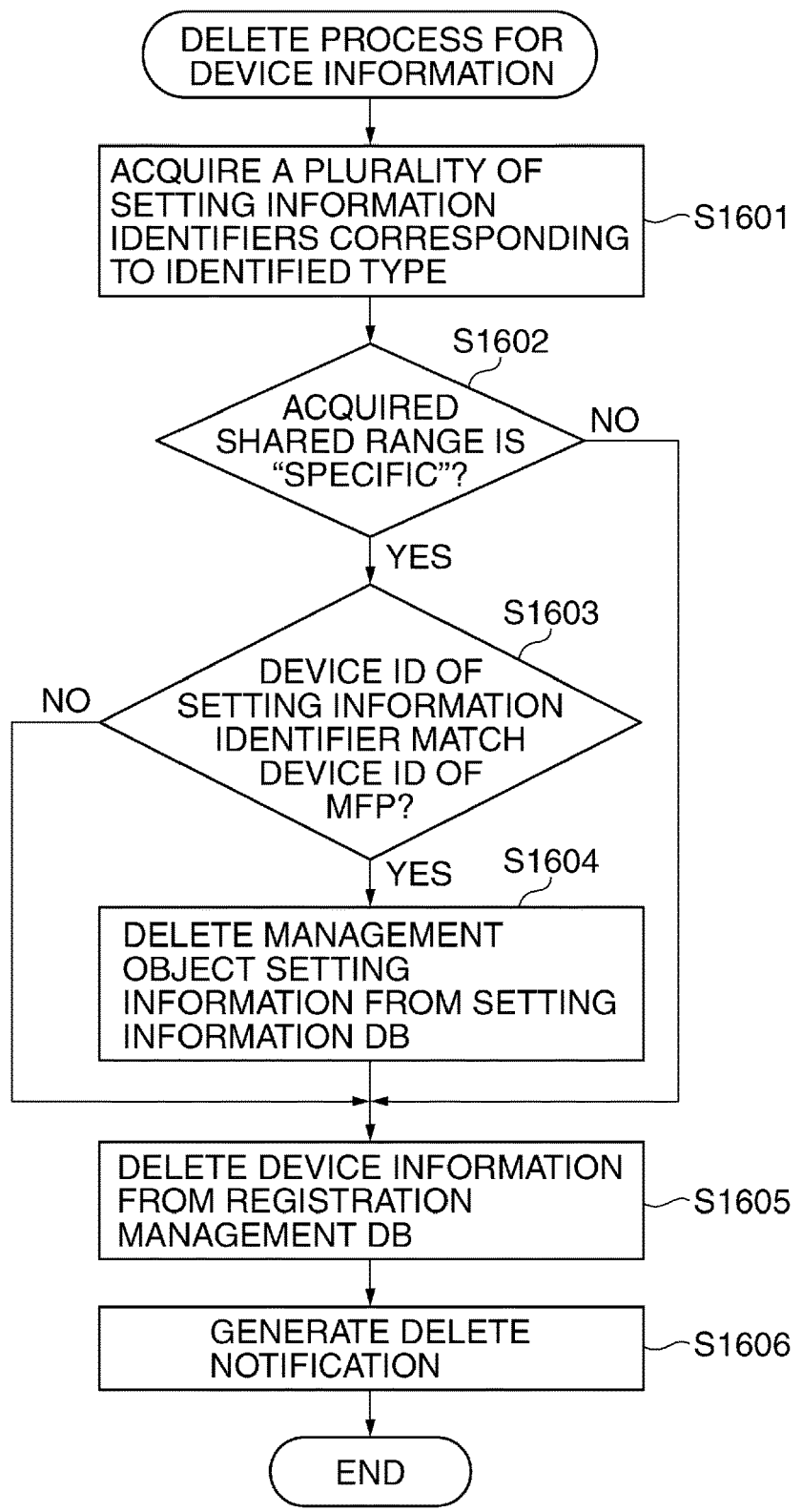
FIG. 25 is a flowchart of a delete process performed in a step in FIG. 20B, for deleting device information.

FIG. 25 is a flowchart of the delete process performed in the step S1117 in FIG. 20B, for deleting device information.

The delete process in FIG. 25 is performed by the CPU 201 that executes the various programs stored in the ROM

202. It is assumed that the delete process in FIG. 25 is performed using the management data 500, by way of example.

Referring to FIG. 25, first, the CPU 201 identifies a type of the management target setting information based on the request notification, and acquires a plurality of setting information identifiers corresponding to the identified type from the setting information database 504 (step S1601). Then, the CPU 201 executes steps S1602 to S1604, described hereinafter, with respect to each of the acquired setting information identifiers. In the following description, a case where the steps S1602 to S1604 are executed with respect to the setting information identifier A as one of the plurality of setting information identifiers will be described by way of example. The CPU 201 acquires the shared range of the setting information identifier A based on the shared range management database 502, and determines whether or not the acquired shared range is "specific" (step S1602).

If it is determined in the step S1602 that the acquired shared range is "specific", the CPU 201 determines whether or not the device ID of the setting information identifier A matches the device ID of the MFP 102 (step S1603).

If it is determined in the step S1603 that the device ID of the setting information identifier A matches the device ID of the MFP 102, the CPU 201 deletes the management target setting information associated with the setting information identifier A from the setting information database 504 (step S1604). The CPU 201 executes the steps S1602 to S1604 also with respect to the setting information identifiers other than the setting information identifier A. Then, the CPU 201 deletes the device information including the individual object identifier based on the request notification and the device ID corresponding to the individual object identifier from the registration management database 501 (step S1605). Then, after the CPU 201 has deleted the device information from the registration management database 501, the CPU 201 generates a notification to the effect that the device information has been deleted from the registration management database 501 (step S1606), followed by terminating the present process and proceeding to the step S1105 in FIG. 20A.

If it is determined in the step S1602 that the acquired shared range is not "specific", or if it is determined in the step S1603 that the device ID of the setting information identifier A does not match the device ID of the MFP 102, the CPU 201 executes the step S1605 et seq.

In the above-described embodiment, in a case where it is determined in the step S1003 of the first variation of the shared range setting process in FIG. 17 that the received update instruction is an instruction for expanding the shared range, the information concerning the setting information of which the shared range has been changed may be deleted, and then new setting information based on the instruction may be generated and added to the setting information database 903.

Figure 26:
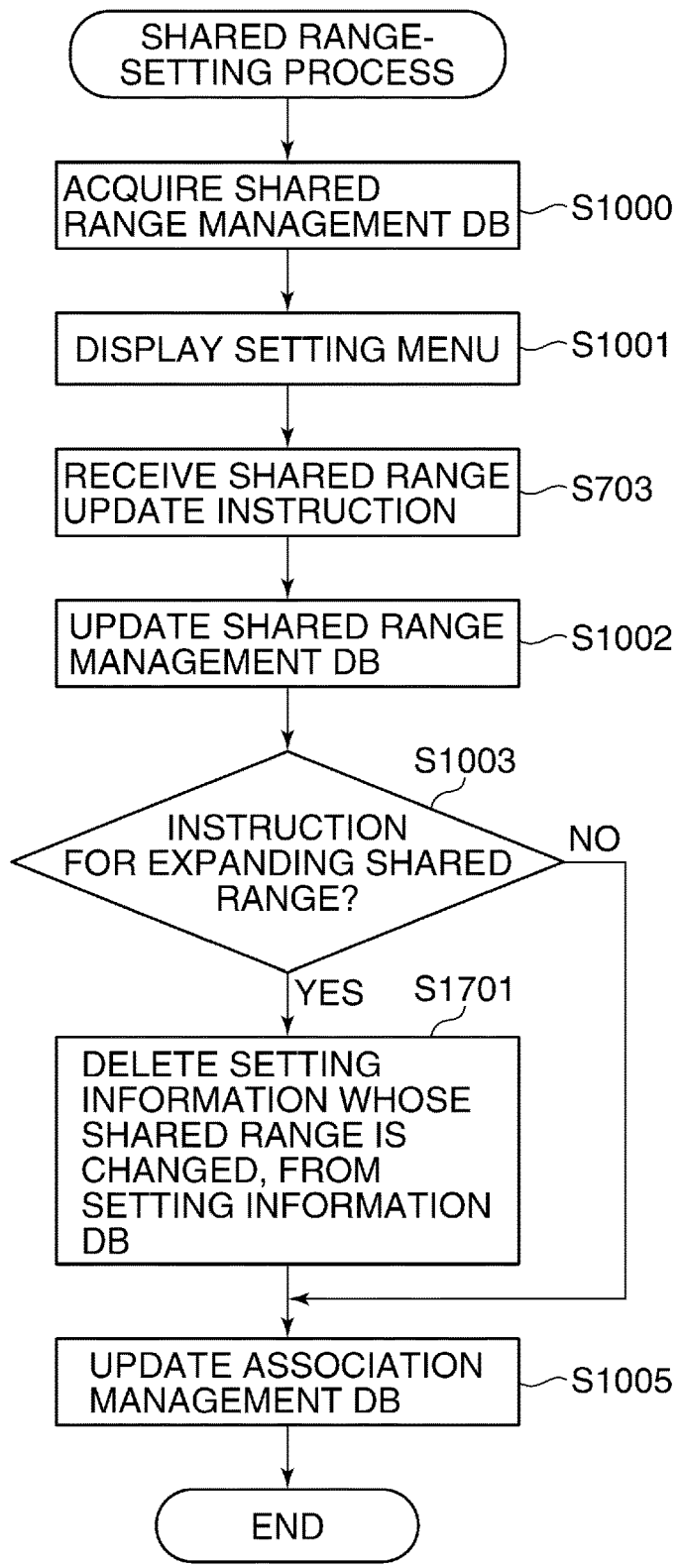
FIG. 26 is a flowchart of a second variation of the shared range-setting process in FIG. 11.

FIG. 26 is a flowchart of a second variation of the shared range-setting process in FIG. 11.

The second variation of the shared range-setting process in FIG. 26 is performed by the CPU 201 that executes various programs stored in the ROM 202.

Referring to FIG. 26, first, the CPU 201 executes the same processing as in the steps S1000 to S1003 in FIG. 17.

If it is determined in the step S1003 that the update instruction received in the step S703 is not an instruction for expanding the shared range, the CPU 201 performs the same processing as in the step S1005 in FIG. 17. Here, the server 101 stores the setting information before changing the shared range even after the shared range is changed.

If it is determined in the step S1003 that the received update instruction is an instruction for expanding the shared range, the CPU 201 deletes the setting information of which the shared range of which has been changed, from the setting information database 903 (step S1701). Then, the CPU 201 executes the step S1005, followed by terminating the present process.

Next, a description will be given of a synchronization request process performed by each synchronization allowing apparatus after the second variation of the shared range-setting process in FIG. 26 is terminated. In the following description, a case where the MFP 102 as the synchronization allowing apparatus performs the synchronization request process by way of example.

Figure 27:
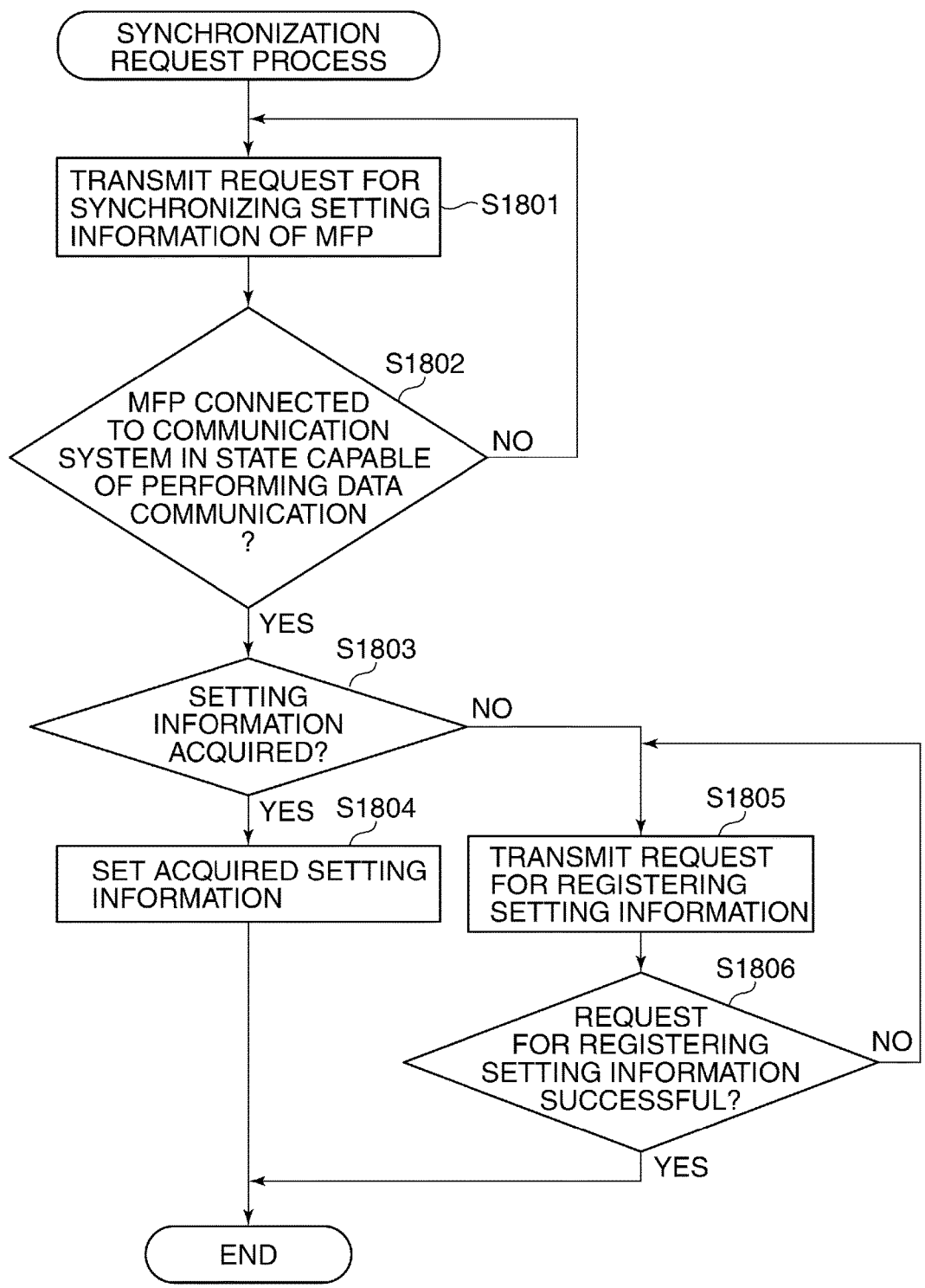
FIG. 27 is a flowchart of a synchronization request process performed by the MFP appearing in FIG. 1.

FIG. 27 is a flowchart of the synchronization request process performed by the MFP 102 appearing in FIG. 1.

The synchronization request process in FIG. 27 is performed by the CPU 301 of the MFP 102 that executes programs stored in the ROM 302.

Referring to FIG. 27, first, the CPU 301 transmits a request for synchronizing the setting information of the MFP 102 to the server 101 (step S1801). For example, the CPU 301 transmits a synchronization request in the process in FIG. 27 when the server 101 and the MFP 102 start synchronization processing for the first time after the server 101 and the MFP 102 are connected to each other, or when synchronization processing is once interrupted so as to perform setting change in the server 101, and is then restarted. In the step S1801, for example, the CPU 301 transmits a synchronization request to the server 101, for synchronizing all types of setting information set in the MFP 102. In the present embodiment, the MFP 102 transmits the synchronization request for each type of setting information. That is, the CPU 301 transmits synchronization requests, separately, as in the case, for example, of transmitting a synchronization request for synchronizing "settings.copy.default_job.copy.dual-side" as a type of setting information, and then transmitting a synchronization request for synchronizing "custom_menu" as a type of setting information.

Upon receipt of the synchronization request from the MFP 102, the server 101 performs a setting information transmission process described hereinafter with reference to FIG. 28. After the step S1801, the CPU 301 determines whether or not the MFP 102 is connected to the communication system 100 in a state capable of performing data communication (step S1802).

If it is determined in the step S1802 that the MFP 102 is not connected to the communication system 100 in the state capable of performing data communication, the CPU 301 returns to the step S1801. On the other hand, if it is determined in the step S1802 that the MFP 102 is connected to the communication system 100 in the state capable of performing data communication, the CPU 301 determines whether or not setting information has been received from the server 101 (step S1803). The step S1803 et seq. is executed whenever the synchronization request is transmitted for each type of setting information. For example, when the CPU 301 transmits a synchronization request for synchronizing "custom_menu", the CPU 301 determines whether or not the setting information of "custom_menu" has been acquired from the server 101.

If it is determined in the step S1803 that the setting information has been acquired from the server 101, the CPU 301 sets the acquired setting information (step S1804). Thus, the setting information stored in the server 101 is synchronized with the MFP 102. Then, the CPU 301 terminates the present process.

If it is determined in the step S1803 that the setting information has not been acquired from the server 101, the CPU 301 transmits a request for registering the setting information of the MFP 102 to the server 101 (step S1805). Then, the CPU 301 determines whether or not the request for registering the setting information of the MFP 102 is successful (step S1806). For example, if the CPU 301 has not received the setting information of "custom_menu" from the server 101 in response to the synchronization request of "custom_menu", the CPU 301 transmits a request for registering the setting information of "custom_menu" stored in the MFP 102.

If it is determined in the step S1806 that the request for registering the setting information of the MFP 102 is not successful, the CPU 301 returns to the step S1805. On the other hand, if it is determined in the step S1806 that the request for registering the setting information of the MFP 102 is successful, the CPU 301 terminates the present process. If the request for registering the setting information of the MFP 102 is successful, the registered setting information of the MFP 102 can be synchronized. As a consequence, even when all pieces of information concerning the setting information of which the shared range has been changed are deleted in the step S1701 in FIG. 26, the setting information of the MFP 102 for performing synchronization processing is stored in the server 101.

Further, after receiving an error response transmitted from the server 101 in a step S1904 in FIG. 28, referred to hereinafter, the CPU 301 does not transmit a request for synchronizing the setting information of the type corresponding to the error response.

Figure 28:
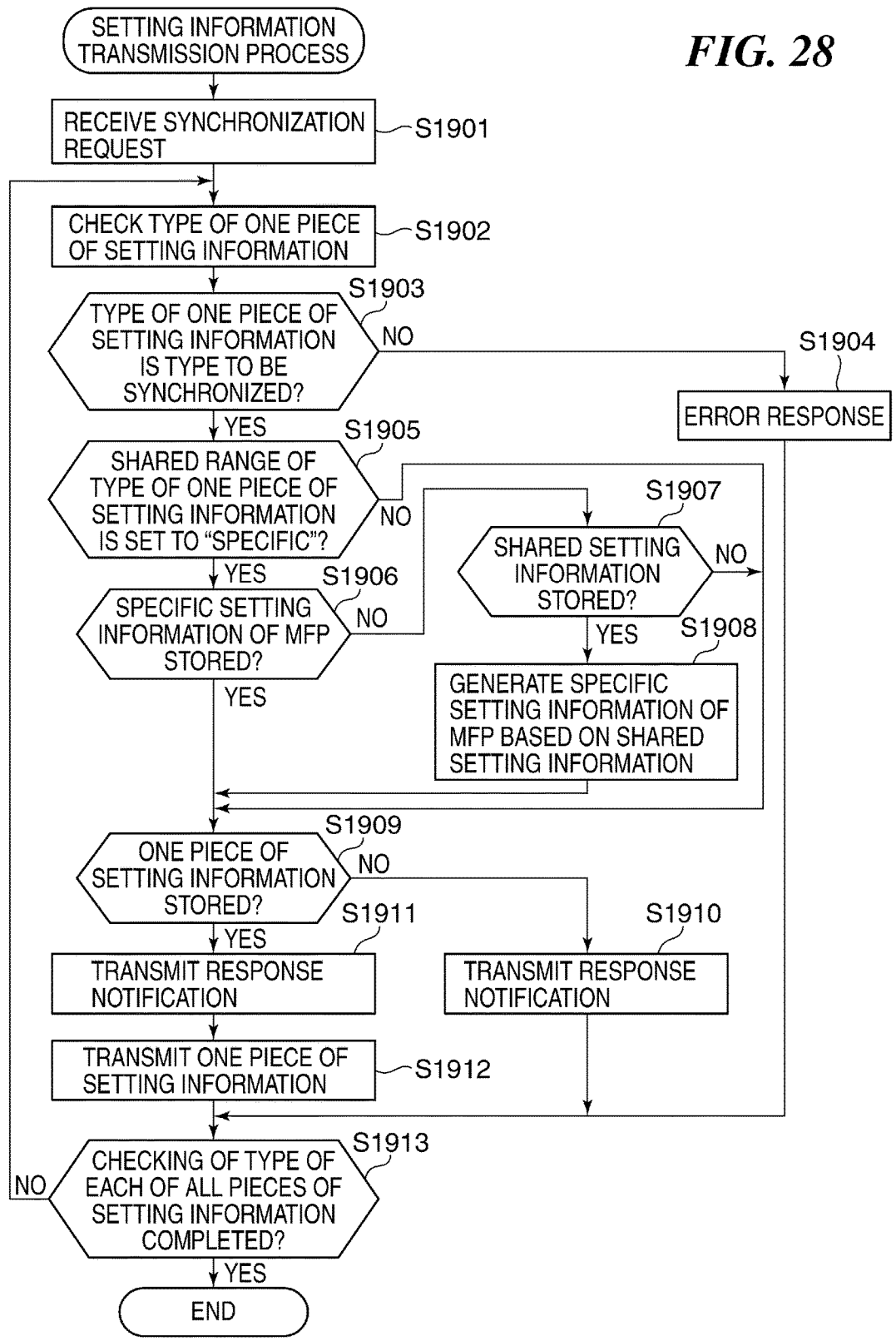
FIG. 28 is a flowchart of a setting information transmission process performed by the server appearing in FIG. 1.

FIG. 28 is a flowchart of the setting information transmission process performed by the server 101 appearing in FIG. 1.

The setting information transmission process in FIG. 28 is performed by the CPU 201 that executes the various programs stored in the ROM 202.

Referring to FIG. 28, first, the CPU 201 receives a synchronization request from a synchronization allowing apparatus (step S1901). For example, in a case where the CPU 201 receives a request from the MFP 102 which is a synchronization allowing apparatus, for synchronizing all pieces of setting information set in the MFP 102 in the step S1901, the CPU 201 executes steps S1902 to S1912, described hereinafter, for each piece of the setting information set in the MFP 102. In the following description, a case where the steps S1902 to S1912 are executed for one of the pieces of setting information set in the MFP 102 will be described by way of example. The CPU 201 checks a type of the one piece of setting information (step S1902), and determines whether or not the type of the one piece of setting information is a type to be synchronized (step S1903). Note that the type to be synchronized is set by a system administrator in advance.

If it is determined in the step S1903 that the type of the one piece of setting information is not a type to be synchronized, the CPU 201 transmits an error response to the MFP 102 (step S1904), and executes a step S1913, referred to hereinafter. On the other hand, if it is determined in the step S1903 that the type of the one piece of setting information is a type to be synchronized, the CPU 201 determines whether or not the shared range of the type of the one piece of setting information is set to "specific" in the shared range management database 901 (step S1905).

If it is determined in the step S1905 that the shared range of the type of the one piece of setting information is not set to "specific", the CPU 201 executes a step S1909, referred to hereinafter. On the other hand, if it is determined in the step S1905 that the shared range of the type of the one piece of setting information is set to "specific", the CPU 201 determines whether or not the one piece of setting information of the MFP 102, of which the shared range is "specific" (hereinafter referred to as the "specific setting information of the MFP 102"), is stored (step S1906). That is, in the step S1906, the CPU 201 determines whether or not the specific setting information of the MFP 102 is managed by the server 101. For example, in a case where the server 101 performs synchronization processing with the MFP 102 for the first time, the server 101 has not stored the specific setting information of the MFP 102. Further, in a case where the MFP 102 and the server 101 are connected to each other for the first time after the shared range of the type of the one piece of setting information is changed from "all" or "group" to "specific", the server 101 has not stored the specific setting information of the MFP 102 in association with the type of the one piece of setting information. If the specific setting information of the MFP 102 is not included in the setting information database 903, the CPU 201 determines that the specific setting information of the MFP 102 is not stored in the server 101. On the other hand, if the specific setting information of the MFP 102 is included in the setting information database 903, the CPU 201 determines that the specific setting information of the MFP 102 is stored in the server 101.

If it is determined in the step S1906 that the specific setting information of the MFP 102 is stored, the CPU 201 executes the step S1909, referred to hereinafter. On the other hand, if it is determined in the step S1906 that the specific setting information of the MFP 102 is not stored, the CPU 201 determines whether or not the one piece of setting information of which the shared range is "group" or "all" (hereinafter referred to as the "shared setting information") is stored (step S1907). The shared setting information is setting information which is synchronized not only with the MFP 102 but also with other synchronization allowing apparatuses, such as the MFP 103. For example, in a case where the shared range of the type of the one piece of setting information is changed from "group" or "all" to "specific", the shared setting information is stored in the server 101. In this case, in the step S1907, the CPU 201 determines that the shared setting information is stored. On the other hand, when the shared setting information is not included in the setting information database 903, the CPU 201 determines that the shared setting information is not stored.

If it is determined in the step S1907 that the shared setting information is not stored, the CPU 201 executes the step S1909, referred to hereinafter. On the other hand, if it is determined in the step S1907 that the shared setting information is stored, the CPU 201 generates specific setting information of the MFP 102 based on the shared setting information (step S1908). For example, the CPU 201 generates the specific setting information of the MFP 102 by duplicating (copying) the shared setting information and changing the shared setting information according to the configuration information of the MFP 102. This makes it possible, in synchronization processing performed for the first time after the shared range is changed from "all" or "group" to "specific", to meet a user's request, such as a request for synchronization of the setting information set when the shared range was set to "all" or "group". Then, the CPU 201 determines whether or not the one piece of setting information is stored (step S1909). In the step S1909, for example, in a case where the shared range of the type of the one piece of setting information is set to "group" or "all" in the shared range management database 901, and also the server 101 stores the shared setting information, the CPU 201 determines that the one piece of setting information is stored. Further, in a case where the shared range of the type of the one piece of setting information is set to "specific" in the shared range management database 901, and also the server 101 stores the specific setting information of the MFP 102, the CPU 201 determines that the one piece of setting information is stored. On the other hand, when neither the shared setting information nor the specific setting information of the MFP 102 is included in the setting information database 903, the CPU 201 determines that the one piece of setting information is not stored.

If it is determined in the step S1909 that the one piece of setting information is not stored, the CPU 201 transmits a response notification to the effect that the synchronization request has been normally received to the MFP 102 (step S1910), and executes the step S1913, referred to hereinafter. On the other hand, if it is determined in the step S1909 that the one piece of setting information is stored, the CPU 201 transmits the above-mentioned response notification to the MFP 102 (step S1911). Then, the CPU 201 transmits the one piece of setting information to the MFP 102 (step S1912). Then, the process proceeds to the step S1913, wherein the CPU 201 determines whether or not the checking of all the types of setting information is completed (step S1913).

If it is determined in the step S1913 the checking of any type of setting information has not been completed, the CPU 201 returns to the step S1902. On the other hand, if it is determined in the step S1913 that the checking of all the types of setting information is completed, the CPU 201 terminates the present process.

Next, a description will be given of examples of processing in FIGS. 26 to 28.

Description will be given of processing performed by the server 101 and the MFP 102 in a case where it is determined in the step S1003 in FIG. 26 that the update instruction received in the step S703 is not an instruction for expanding the shared range.

The following description is given, by way of example, of a case where the shared range of "custom_menu" appearing in FIG. 14 is changed from "all" to "specific".

When setting change is performed based on the above instruction such that the shared range of "custom_menu" is narrowed, the CPU 201 performs the following processing: The server 101 prepares a scheme in the setting information database 903, for registering the setting information of "custom_menu" in the MFPs 102 and 103, respectively, which are the synchronization allowing apparatuses. At this time point, data of each of the synchronization allowing apparatuses, corresponding to "custom_menu", is empty. Further, the server 101 stores the shared setting information of "custom_menu", of which the shared range is "all", in the setting information database 903. Then, the association management database 902 is updated in the step S1005 in FIG. 26, and the server 101 terminates the second variation of the shared range-setting process in FIG. 26.

When the second variation of the shared range-setting process in FIG. 26 is terminated, the system administrator reconnects the server 101 and the MFP 102. Reconnection is performed e.g. by inputting an instruction for starting synchronization processing with the server 101 to the MFP 102 in a state in which the server 101 and the MFP 102 are connected to the network. When reconnection between the server 101 and the MFP 102 is instructed, the MFP 102 performs the synchronization request process in FIG. 27, and transmits a request for synchronizing a plurality of pieces of setting information including "custom_menu" to the server 101 (step S1801).

The server 101 receives the synchronization request (step S1901), and selects "custom_menu" as one piece of setting information from the plurality of pieces of setting information. If it is determined that "custom_menu" is a type to be synchronized (YES to the step S1903), the server 101 executes the step S1905. Here, the step S1905 is executed assuming that the shared range setting of "custom_menu" is changed to "specific", and hence the server 101 determines that the shared range of "custom_menu" is set to "specific" (YES to the step S1905), and executes the step S1906. As described above, at the time point when the shared range setting of "custom_menu" is changed from "all" to "specific", the data corresponding to "custom_menu" as the specific setting information of the MFP 102 is empty in the setting information database 903, and hence in the step S1906, the server 101 determines that the specific setting information of the MFP 102 of "custom_menu" is not stored (NO to the step S1906). Then, the server 101 executes the step S1907. As described above, since the shared setting information of "custom_menu" is stored in the setting information database 903, it is determined in the step S1907 that the shared setting information of "custom_menu" is stored in the server 101. Then, the server 101 generates "custom_menu" of the MFP 102 based on the shared setting information of "custom_menu". For example, the server 101 generates the specific setting information of the MFP 102 of "custom_menu" by duplicating (copying) the shared setting information of "custom_menu". Then, the server 101 transmits the response notification and the generated specific setting information of the MFP 102 of "custom_menu" to the MFP 102 (e.g. steps S1911 and S1912).

When the setting change for narrowing the shared range is performed as described above, the setting information after the setting change is registered in the server 101 based on the setting information used before the setting change.

Description will be given of processing performed by the server 101 and the MFP 102 in a case where it is determined in the step S1003 in FIG. 26 that the update instruction received in the step S703 is an instruction for expanding the shared range.

The following description is given, by way of example, of a case where the shared range of "settings.copy.default_job.copy.dual-side" appearing in FIG. 16 is changed from "group 0" to "all" by way of example.

When setting change is performed based on the instruction for expanding the shared range such that the shared range of "settings.copy.default_job.copy.dual-side" is expanded, the server 101 performs the following processing: The server 101 deletes the setting information of "settings.copy.default_job.copy.dual-side". More specifically, the server 101 deletes "single-side" which is data of the setting information identifier "settings.copy.default_job.copy.dual-side" indicated by a setting information ID of 1 associated with a shared range ID of 1 indicating a group identifier of 0 (group 0) from the setting information database 903. Then, the association management database 902 is updated in the step S1005, and the server 101 terminates the second variation of the shared range-setting process in FIG. 26.

When the second variation of the shared range-setting process in FIG. 26 is terminated, the system administrator reconnects the server 101 and the MFP 102.

When reconnection between the server 101 and the MFP 102 is instructed, the MFP 102 performs the synchronization request process in FIG. 27. For example, the MFP 102 transmits a request for synchronizing a plurality of pieces of setting information including "settings.copy.default_job-.copy.dual-side" to the server 101 (step S1801).

The server 101 receives the synchronization request (step S1901), and selects "settings.copy.default_job.copy.dual-side" as one piece of setting information from the plurality of pieces of setting information. If "settings.copy.default_job.copy.dual-side" is a type to be synchronized (YES to the step S1903), the server 101 executes the step S1905. Here, it is assumed that the shared range setting of "settings.copy.default_job.copy.dual-side" is changed to "all", the server 101 determines that the shared range setting is not set to "specific" (NO to the step S1905). Then, the server 101 determines whether or not the setting information of "settings.copy.default_job.copy.dual-side" is stored (step S1909). As described in the step S1701 in FIG. 26, when the setting change for expanding the shared range is performed, the setting information stored before the setting change is deleted. Therefore, in the step S1909, the server 101 determines that the setting information of "settings.copy.default_job.copy.dual-side" is not stored (NO to the step S1909). Then, the server 101 transmits only the response notification to the MFP 102.

Here, the operation of the MFP 102 having received only the response notification will be described with reference to the flowchart in FIG. 27. In the step S1803, the MFP 102 determines that the setting information has not been acquired (NO to the step S1803). Then, the MFP 102 requests the server 101 to register the setting information of "settings.copy.default_job.copy.dual-side" stored by the MFP 102 (step S1805).

The server 101 registers the setting information requested to be registered from the MFP 102 as the shared setting information of "settings.copy.default_job.copy.dual-side". Thus, when the setting change for expanding the shared range is performed, the setting information stored in the MFP 102 which is connected to the server 101 for the first time after the setting change is registered in the server 101 as the shared setting information. This makes it possible to perform the process for causing the server 101 and the MFP 102 to synchronize the setting information after the shared range is set.

Although in the above-described embodiment, the specific setting information of the MFP 102 is generated by duplicating the shared setting information in the step S1908, the specific setting information of the MFP 102 is not limited to the setting information generated by duplicating the shared setting information. For example, the setting information set e.g. by a user's operation on the operation section 208 as the specific setting information of the MFP 102 may be set as the specific setting information of the MFP 102.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-170519 filed Aug. 31, 2015, and 2016-071547 filed Mar. 31, 2016, which are hereby incorporated by reference wherein in their entirety.

What is claimed is:

1. An information processing apparatus configured to perform data communication with a plurality of image processing apparatuses, the information processing apparatus comprising:
    a storage device storing setting data of the plurality of image processing apparatuses as management data;
    at least one memory device storing instructions; and
    at least one processor that executes the instructions to:
        set, according to a user operation, one of a plurality of ranges for a first setting type of the setting data stored in the storage device, wherein the plurality of ranges include at least a first range indicating that the setting data is to be managed for each of the plurality of image processing apparatuses, and a second range indicating that the setting data is to be shared with the plurality of image processing apparatuses;
        in a case where the first range is set from among the plurality of ranges:
            manage respective setting data, corresponding to the setting type for each of the plurality of image processing apparatuses with the respective setting data stored as the management data in the storage device, for each of the plurality of image processing apparatuses; and
            update, based on a notification relating to update about settings of an image processing apparatus among the plurality of image processing apparatuses, the setting data of the specific image processing apparatus stored as the management data in the storage device; and
        in a case where the second range is set from among the plurality of ranges:
            manage common setting data corresponding to the setting type for the plurality of image processing apparatuses with the common setting data stored as the management data in the storage device;

update, based on a notification relating to update about settings of one of the plurality of image processing apparatuses, the common setting data corresponding to the setting type stored as the management data in the storage device; and synchronize, after the update of the common setting data, the management data stored in the storage device with the plurality of image processing apparatuses, wherein, according to the synchronization, the setting data of each of the plurality of image processing apparatuses is updated.

2. The information processing apparatus according to claim 1, wherein:

the plurality of image forming apparatuses are grouped into at least one group;

the plurality of ranges further include a third range indicating that setting data is to be shared with one of the at least one group; and the instructions further cause the information processing apparatus to, in a case where the third range is set from among the plurality of ranges:

manage group setting data corresponding to the setting type for a plurality of image processing apparatuses belonging to the group with the group setting data stored as management data in the storage device;

update, based on a notification relating to update about settings of an image processing apparatus belonging to the group, the group setting data corresponding to the setting type stored as the management data in the storage device; and synchronize, after the update of the group setting data, the management data stored in the storage device with the plurality of image processing apparatuses belonging to the group, wherein, according to the synchronization, the setting data of each of the plurality of image processing apparatuses belonging to the group is updated.

3. The information processing apparatus according to claim 1, wherein the instructions further cause the information processing apparatus to display, on a display device of the information processing apparatus, a selecting screen for selecting one of the plurality of ranges to set the range.

4. A communication system including:

a plurality of image processing apparatuses; and an information processing apparatus configured to perform data communication with the plurality of image processing apparatuses, and comprising:

a storage device storing setting data of the plurality of image processing apparatuses as management data;

at least one memory device storing instructions; and at least one processor that executes the instructions to:

set, according to a user operation, one of a plurality of ranges for a first setting type of the setting data stored in the storage device, wherein the plurality of ranges include at least a first range indicating that the setting data is to be managed for each of the plurality of image processing apparatuses, and a second range indicating that the setting data is to be shared with the plurality of image processing apparatuses;

in a case where the first range is set from among the plurality of ranges:

manage respective setting data, corresponding to the setting type for each of the plurality of image processing apparatuses with the respective setting data stored as the management data in the storage device, for each of the plurality of image processing apparatuses; and update, based on a notification relating to update about settings of an image processing apparatus among the plurality of image processing apparatuses, the setting data of the image processing apparatus stored as the management data in the storage device; and in a case where the second range is set from among the plurality of ranges:

manage common setting data corresponding to the setting type for the plurality of image processing apparatuses with the common setting data stored as the management data in the storage device;

update, based on a notification relating to update about settings of one of the plurality of image processing apparatuses, the common setting data corresponding to the setting type stored as the management data in the storage device; and synchronize, after the update of the common setting data, the management data stored in the storage device with the plurality of image processing apparatuses, wherein, according to the synchronization, the setting data of each of the plurality of image processing apparatuses is updated.

5. A synchronization method for a communication system including a plurality of image processing apparatuses and an information processing apparatus configured to perform data communication with the plurality of image processing apparatuses, the synchronizing method comprising the steps of:

setting, according to a user operation, one of a plurality of ranges for a first setting type of the setting data stored in the storage device, wherein the plurality of ranges include at least a first range indicating that the setting data is to be managed for each of the plurality of image processing apparatuses, and a second range indicating that the setting data is to be shared with the plurality of image processing apparatuses;

in a case where the first range is set from among the plurality of ranges:

managing respective setting data, corresponding to the setting type for each of the plurality of image processing apparatuses with the respective setting data stored as the management data in the storage device, for each of the plurality of image processing apparatuses; and updating, based on a notification relating to update about settings of an image processing apparatus among the plurality of image processing apparatuses, the setting data of the image processing apparatus stored as the management data in the storage device; and in a case where the second range is set from among the plurality of ranges:

managing common setting data corresponding to the setting type for the plurality of image processing apparatuses with the common setting data stored as the management data in the storage device;

updating, based on a notification relating to update about settings of one of the plurality of image processing apparatuses, the common setting data corresponding to the setting type stored as the management data in the storage device; and synchronizing, after the update of the common setting data, the management data stored in the storage device with the plurality of image processing apparatuses, wherein, according to the synchronization, the setting data of each of the plurality of image processing apparatuses is updated.

6. A non-transitory computer-readable storage medium storing a computer-executable program executable by a computer to execute a synchronization method for a communication system having a plurality of image processing apparatuses and an information processing apparatus configured to perform data communication with the plurality of image processing apparatuses, the synchronizing method comprising the steps of:

setting, according to a user operation, one of a plurality of ranges for a first setting type of the setting data stored in the storage device, wherein the plurality of ranges include at least a first range indicating that the setting data is to be managed for each of the plurality of image processing apparatuses, and a second range indicating that the setting data is to be shared with the plurality of image processing apparatuses;

in a case where the first range is set from among the plurality of ranges:

managing respective setting data, corresponding to the setting type for each of the plurality of image processing apparatuses with the respective setting data stored as the management data in the storage device, for each of the plurality of image processing apparatuses; and updating, based on a notification relating to update about settings of an image processing apparatus among the plurality of image processing apparatuses, the setting data of the image processing apparatus stored as the management data in the storage device; and in a case where the second range is set from among the plurality of ranges:

managing common setting data corresponding to the setting type for the plurality of image processing apparatuses with the common setting data stored as the management data in the storage device;

updating, based on a notification relating to update about settings of one of the plurality of image processing apparatuses, the common setting data corresponding to the setting type stored as the management data in the storage device; and synchronizing, after the update of the common setting data, the management data stored in the storage device with the plurality of image processing apparatuses, wherein, according to the synchronization, the setting data of each of the plurality of image processing apparatuses is updated.

* * * * *